(12) United States Patent
Masuda

(10) Patent No.: US 8,336,064 B2
(45) Date of Patent: Dec. 18, 2012

(54) ELECTRONIC APPARATUS FOR DRIVING AN OPTICAL DISC AND HAVING A REDUCED SIZE AND/OR THICKNESS

(75) Inventor: Hiromasa Masuda, Tokyo (JP)

(73) Assignee: Sony Corporation (JP)

( * ) Notice: Subject to any disclaimer, the term of this patent is extended or adjusted under 35 U.S.C. 154(b) by 508 days.

(21) Appl. No.: 12/592,061

(22) Filed: Nov. 18, 2009

(65) Prior Publication Data

US 2010/0153979 A1 Jun. 17, 2010

(30) Foreign Application Priority Data

Dec. 11, 2008 (JP) ................ P2008-315300

(51) Int. Cl.
*G11B 17/03* (2006.01)
*G11B 33/12* (2006.01)
(52) U.S. Cl. ........................ 720/655; 720/652
(58) Field of Classification Search ............ 361/679.33–679.39; 720/600–613, 646, 647, 652–657
See application file for complete search history.

(56) References Cited

U.S. PATENT DOCUMENTS

| 6,862,739 | B1 * | 3/2005 | Hunter et al. | 720/653 |
| 7,007,283 | B2 * | 2/2006 | Lin | 720/600 |
| 8,032,901 | B2 * | 10/2011 | Kobayashi | 720/655 |
| 2006/0168606 | A1 | 7/2006 | Lin et al. | |

FOREIGN PATENT DOCUMENTS

| JP | 06338123 A | 12/1994 |
| JP | 09204763 A | 8/1997 |
| JP | 2000-187973 A | 7/2000 |
| JP | 2006-209948 A | 8/2006 |

OTHER PUBLICATIONS

Office Action from Japanese Application No. 2008-315300, dated Nov. 24, 2010.

* cited by examiner

*Primary Examiner* — Nathan Danielsen
(74) *Attorney, Agent, or Firm* — Lerner, David, Littenberg, Krumholz & Mentlik, LLP

(57) ABSTRACT

Disclosed is an electronic apparatus including a main body portion, a tray main body, a tray auxiliary portion, a first top panel, and a second top panel. The tray main body is capable of being taken into and out of the main body portion and includes a mounted portion, a drive portion, an optical system, and a first store portion. The tray auxiliary portion includes a second store portion that is integrated with the first store portion of the tray main body to form a space capable of storing the optical disc mounted on the mounted portion.

6 Claims, 15 Drawing Sheets

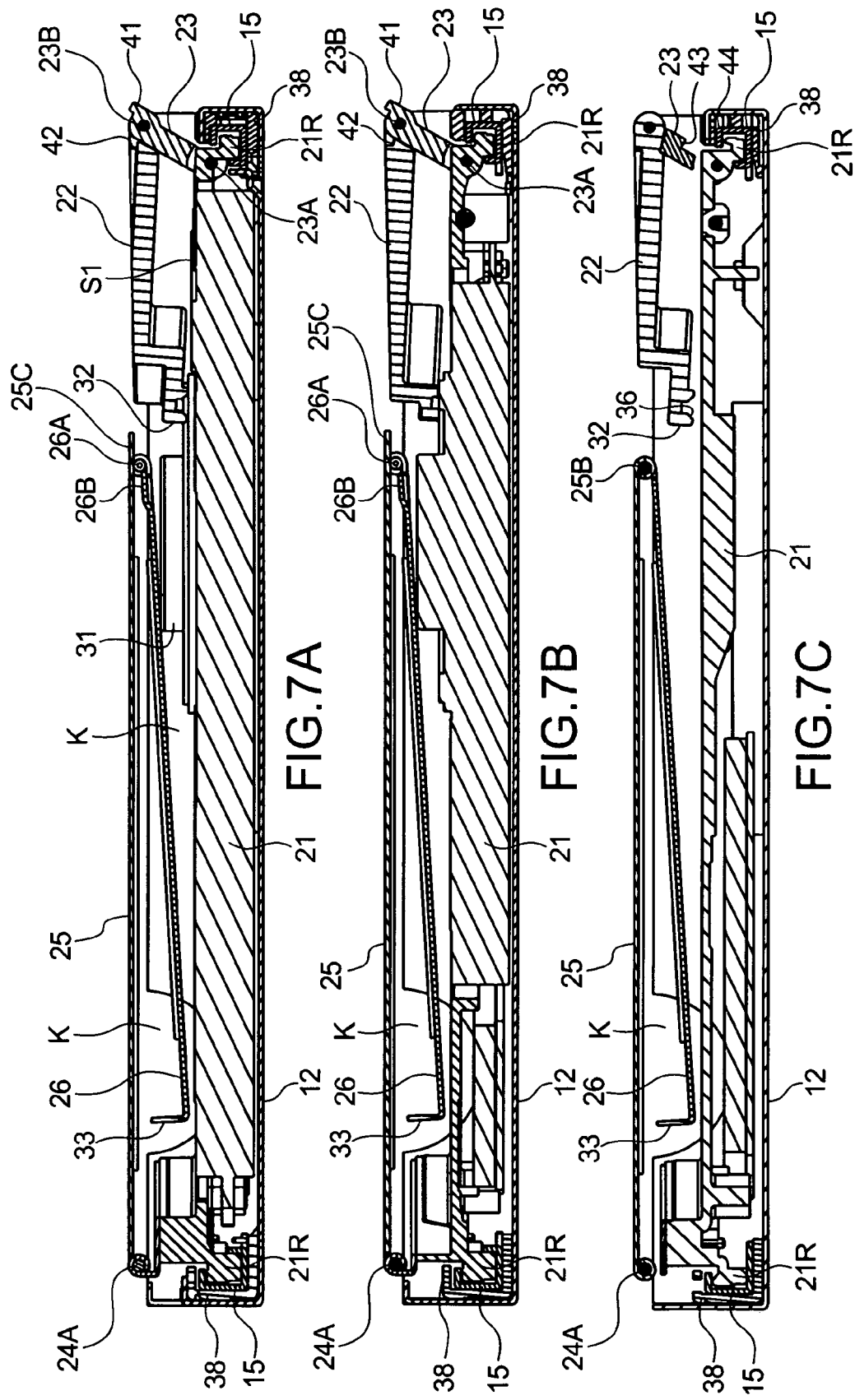

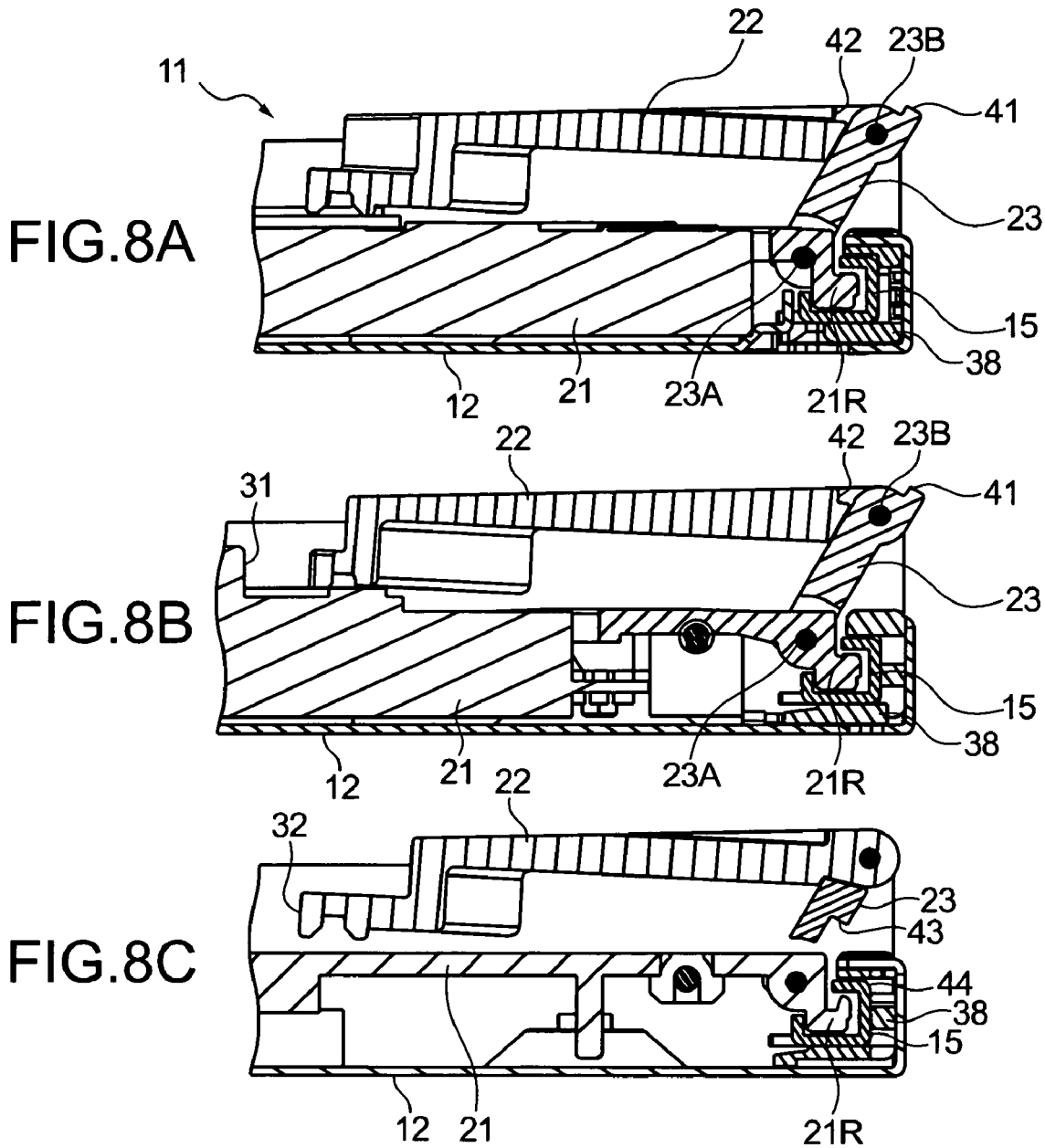

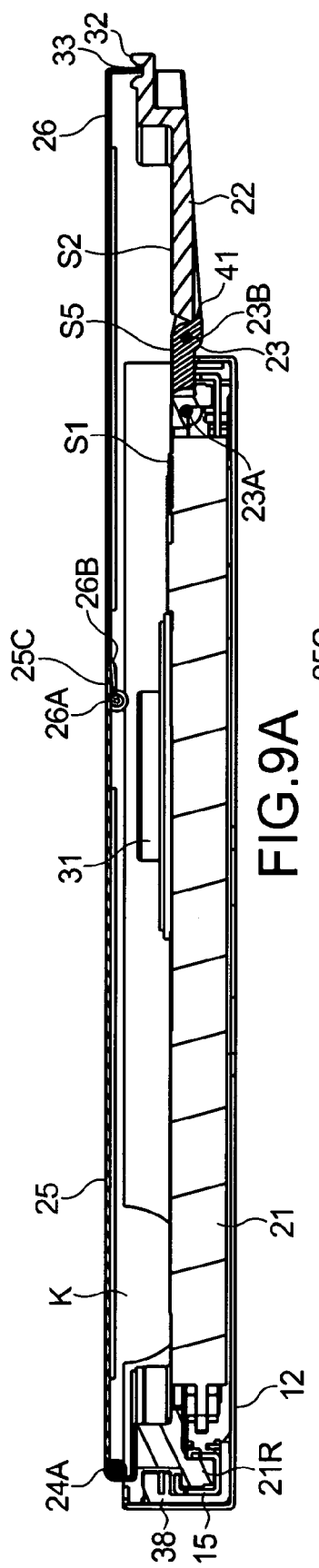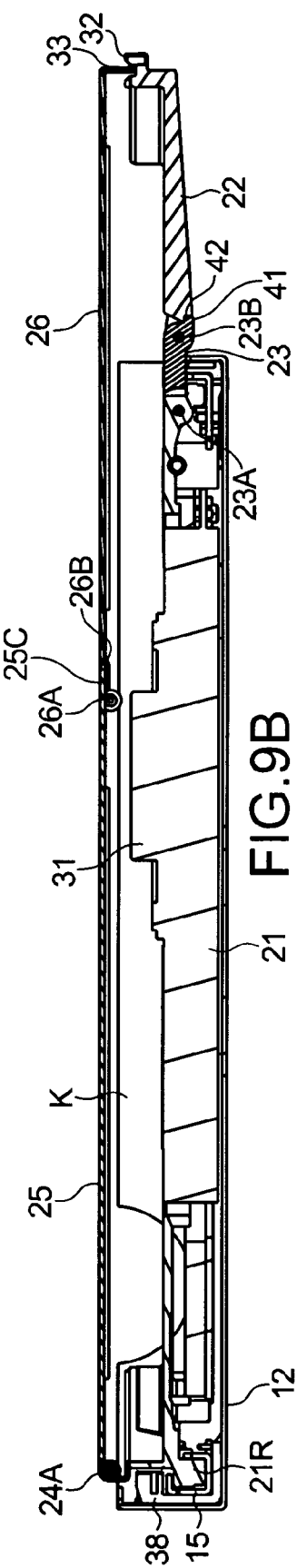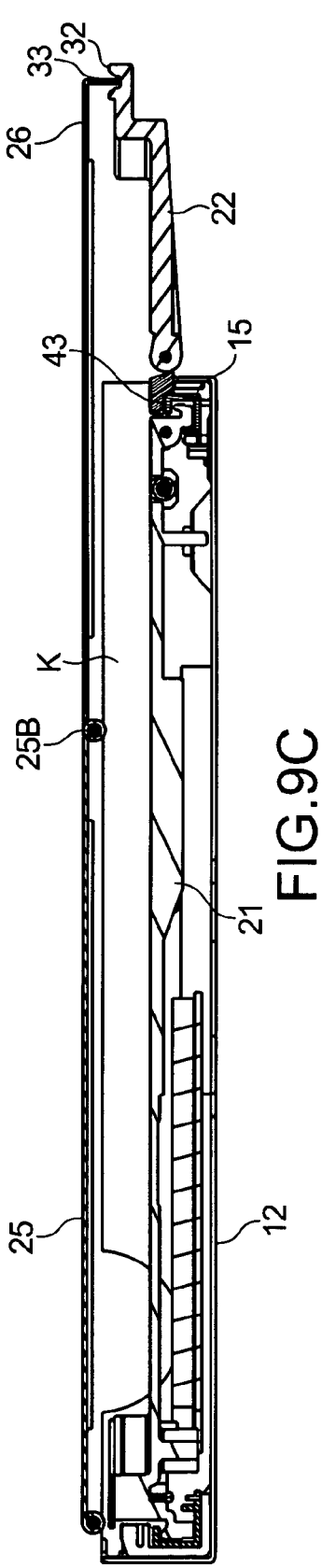

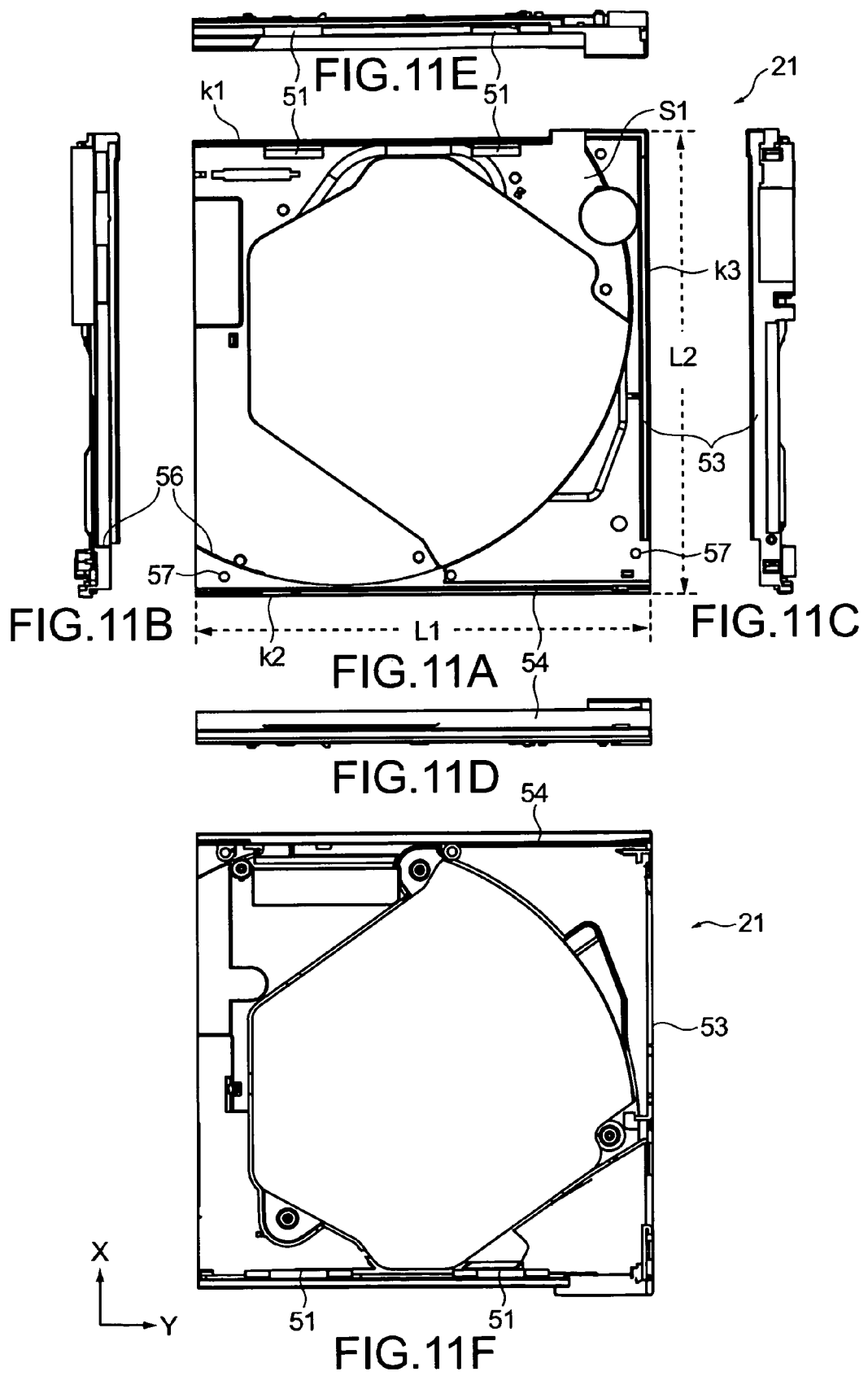

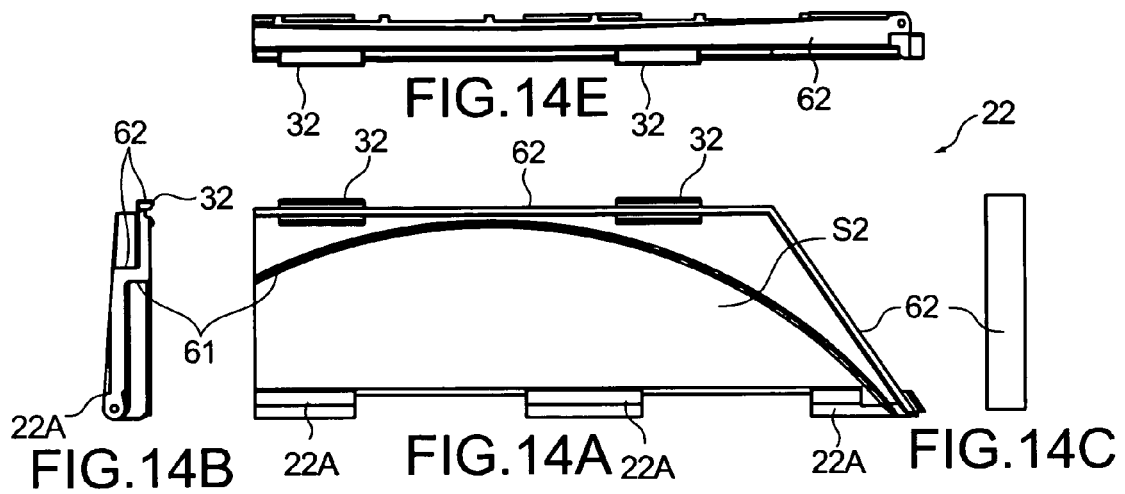
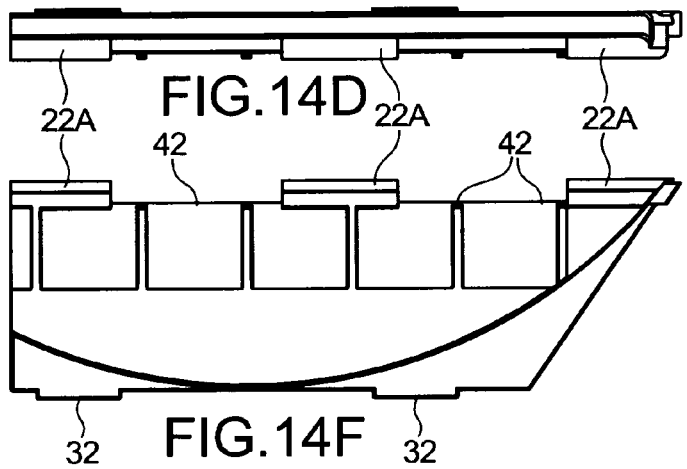
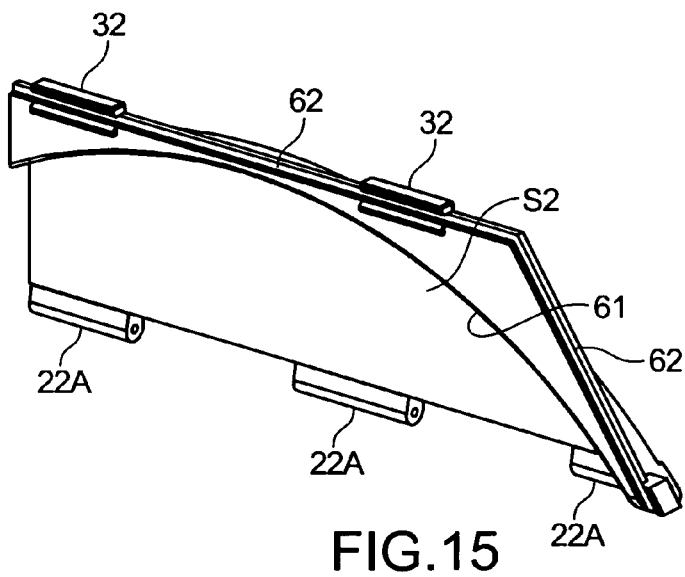

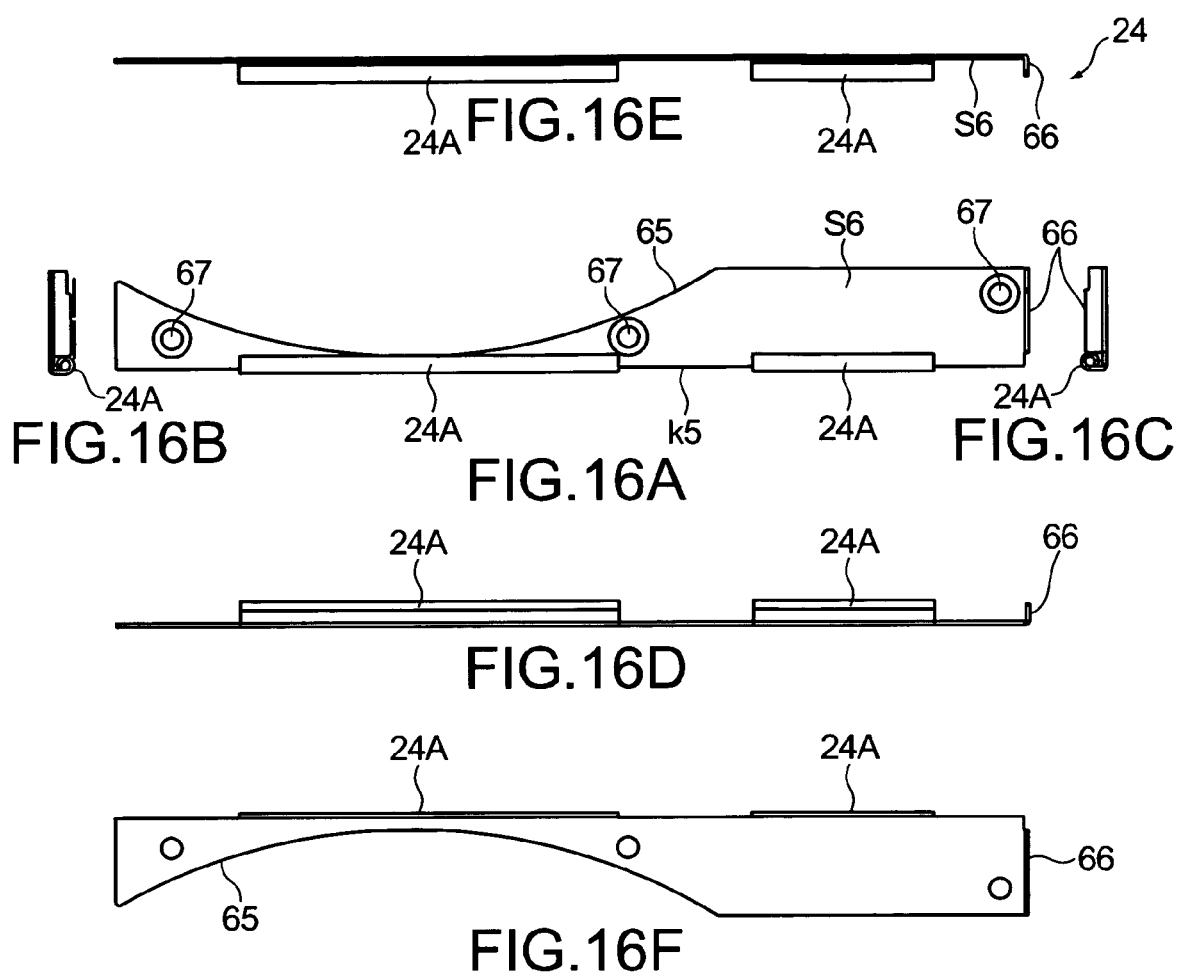

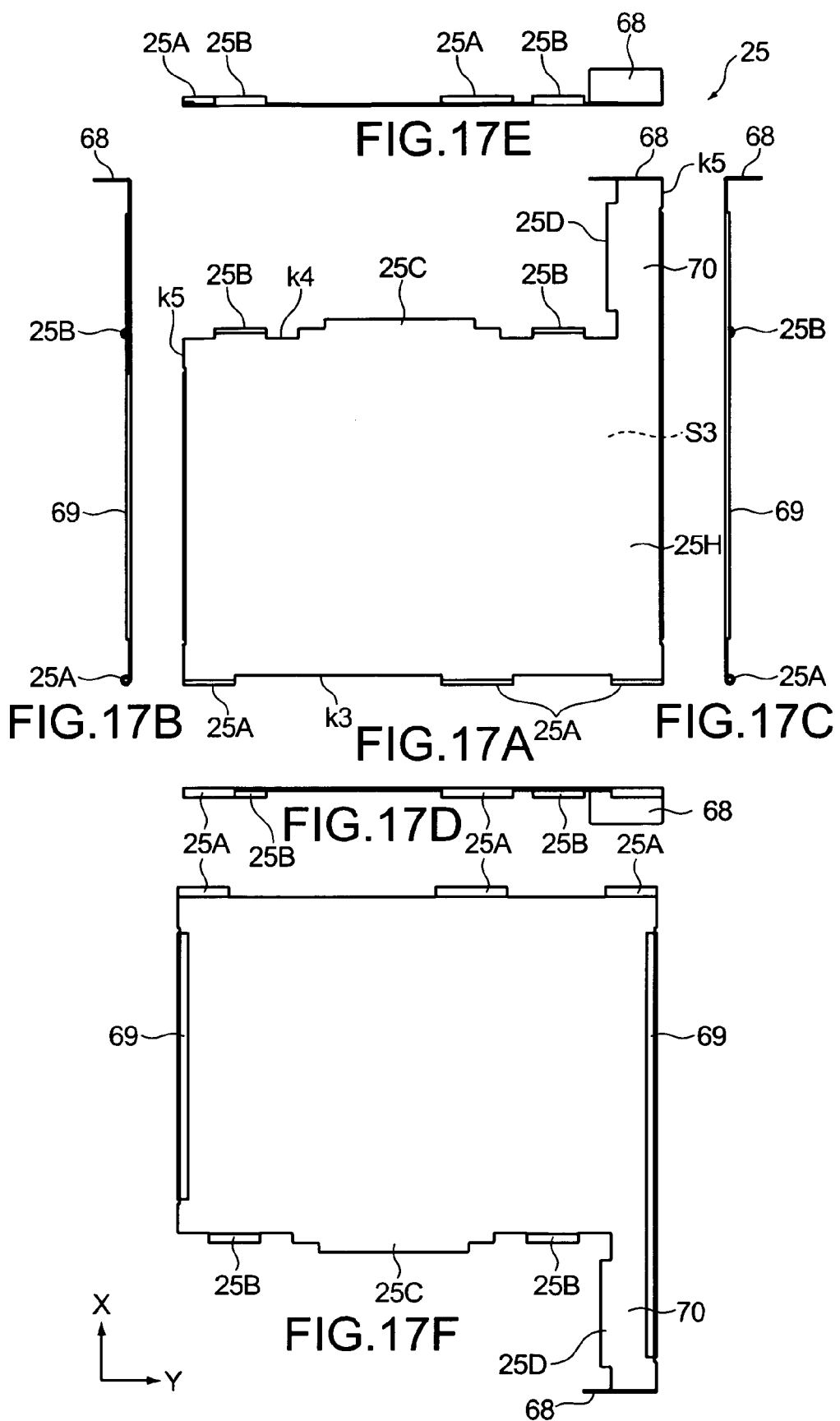

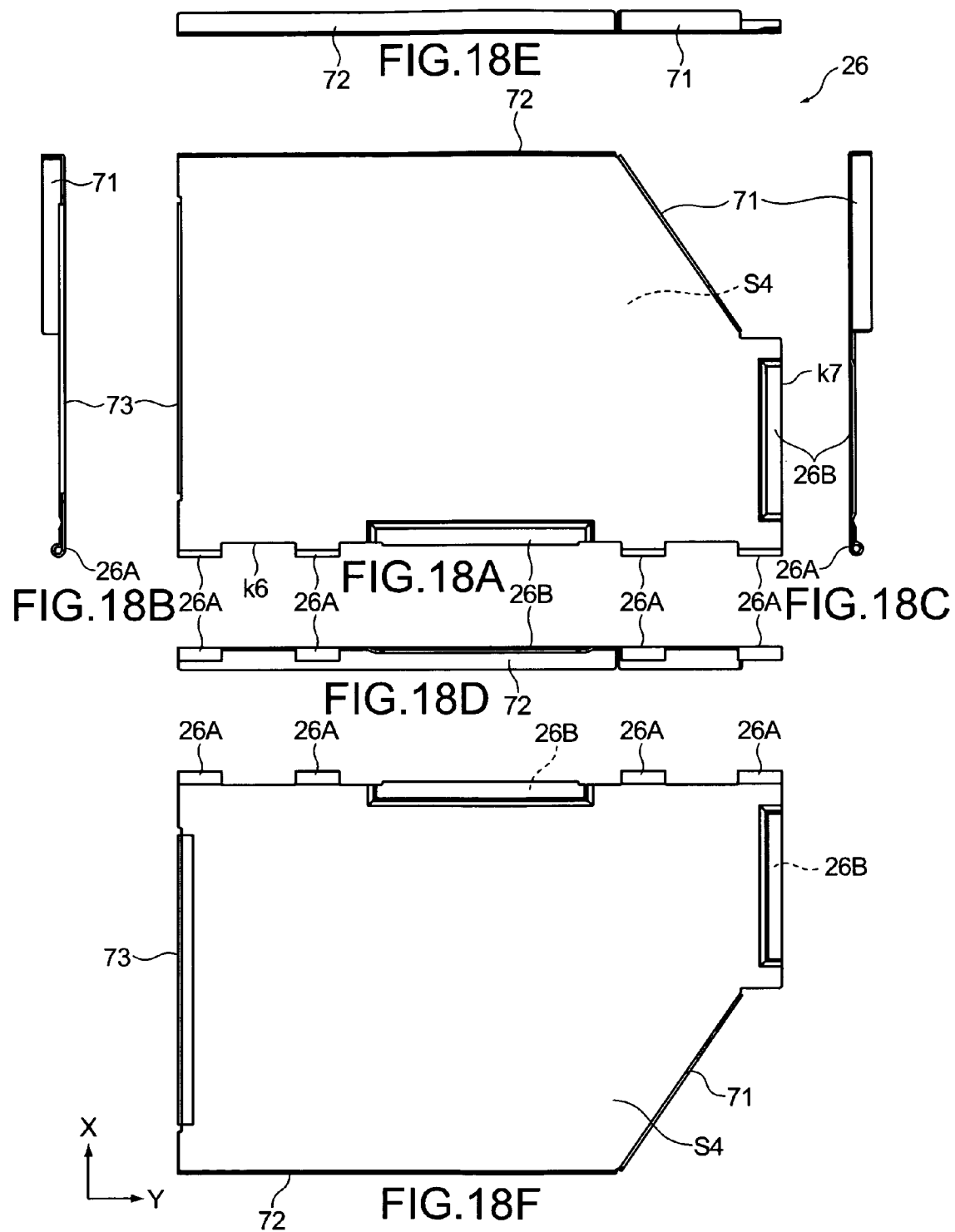

ELECTRONIC APPARATUS FOR DRIVING AN OPTICAL DISC AND HAVING A REDUCED SIZE AND/OR THICKNESS

CROSS-REFERENCE TO RELATED APPLICATION

The present application claims priority from Japanese Patent Application No. JP 2008-315300 filed in the Japanese Patent Office on Dec. 11, 2008, the entire content of which is incorporated herein by reference.

BACKGROUND OF THE INVENTION

1. Field of the Invention

The present invention relates to an electronic apparatus equipped with an optical disc drive portion that drives an optical disc.

2. Description of the Related Art

These days, a casing of an optical disc drive is increasingly reduced in size along with miniaturization of an optical disc drive mechanism or the like therein. However, generally, an optical disc is stored in an optical disc drive and used, so it is difficult to make a casing of the optical disc drive smaller than the optical disc. To realize further miniaturization of the optical disc drive, there have been proposed some structures of optical disc drives whose casings can be made to be smaller than the optical disc.

For example, there has been proposed an optical disc drive that secures a sufficient optical disc storing area in use and can make a casing thereof compact in non-use without any constraint of an outer size of the optical disc, which enhances portability. With this optical disc drive, the casing is constituted of a fixed portion and an extendable portion, and the optical disc storing area can be secured in the casing by extending the extendable portion (see, for example, Japanese Patent Application Laid-open No. 2000-187973 (paragraph 0011, FIG. 1) (hereinafter, referred to as Patent Document 1)).

Further, there has been proposed an optical disc drive constituted of a movable case and a main case in which an optical pickup module is provided. In this optical disc drive, the main case is stored in the movable case when data is unnecessary to be read and is separated from the movable case when data is read. The optical disc is covered with both of the main case and the movable case (see, for example, Japanese Patent Application Laid-open No. 2006-209948 (paragraph 0031, FIGS. 13 and 14) (hereinafter, referred to as Patent Document 2)).

SUMMARY OF THE INVENTION

However, the optical disc drive disclosed in Patent Document 1 has a problem of poor incorporation into another apparatus such as a laptop personal computer. That is, the optical disc drive has an extendable mechanism, which increases the thickness or size of another apparatus when the optical disc drive is incorporated therein.

Further, the optical disc drive disclosed in Patent Document 2 has the structure in which the main case is stored in the movable case, resulting in the increase of the thickness of the optical disc drive. As a result, there arises a problem in that when the optical disc drive is incorporated in another apparatus, the thickness or size of the apparatus is increased.

In view of the above-mentioned circumstances, it is desirable to provide an electronic apparatus that drives an optical disc and that can be reduced in size and thickness.

According to an embodiment of the present invention, there is provided an electronic apparatus including a main body portion, a tray main body, a tray auxiliary portion, a first top panel, and a second top panel. The tray main body is capable of being taken into and out of the main body portion and includes a mounted portion, a drive portion, an optical system, and a first store portion. The mounted portion is fitted to a center hole portion of an optical disc to allow the optical disc to be mounted thereon. The drive portion drives the mounted portion. The optical system irradiates the optical disc with light and receives reflection light. The first store portion is a part of a store portion that stores the optical disc mounted on the mounted portion. The tray auxiliary portion includes a second store portion that is another part of the store portion formed along an outline of the optical disc mounted on the mounted portion. The second store portion is integrated with the first store portion of the tray main body to form a space on at least one of both sides in a second direction that is perpendicular to a first direction. The space is capable of storing the optical disc mounted on the mounted portion. The first direction corresponds to a direction in which the tray main body is taken into and out of the main body portion. The tray auxiliary portion is capable of moving between a first position and a second position. The first position corresponds to a position at which a size of the space in at least the second direction is larger than a diameter of the optical disc, and the second position corresponds to a position at which the tray auxiliary portion is stored in the tray main body so that the tray auxiliary portion and the tray main body are capable of being taken into and out of the main body portion. The first top panel is capable of being moved between a third position and a fourth position. The third position corresponds to a position at which the optical disc is capable of being mounted on and detached from the mounted portion, and the fourth position corresponds to a position at which the first top panel is capable of covering at least a part of the first store portion of the tray main body so that the optical disc mounted on the mounted portion is capable of being covered and so that the first top panel and the tray main body are capable of being taken into and out of the main body portion. The second top panel is capable of being moved between a fifth position and a sixth position. The fifth position corresponds to a position at which the second top panel is capable of covering an area other than an area covered with the first top panel at the fourth position in the first store portion of the tray main body and covering the second store portion of the tray auxiliary portion at the first position. The sixth position corresponds to a position at which the second top panel is overlapped with the first top panel so that the second top panel, the first top panel, the tray auxiliary portion, and the tray main body are capable of being taken into and out of the main body portion.

In this embodiment, the tray main body is taken out of the main body portion, the tray auxiliary portion is moved to the first position at which the second store portion is integrated with the first store portion of the tray main body to form the space capable of storing the optical disc mounted on the mounted portion, the first top panel and the second top panel are moved to the third position at which the optical disc can be mounted on/detached from the mounted portion, the second top panel is moved to the fifth position with respect to the first top panel, the optical disc is mounted on the mounted portion, the first top panel integrated with the second top panel is moved to the fourth position, and the area other than the area covered with the first top panel in the first store portion of the tray main body and the second store portion of the tray auxiliary portion at the first position are covered with the second top panel, with the result that the optical disc can be stored. In addition, the first top panel and the second top panel are moved to the third position at which the optical disc can be mounted on/detached from the mounted portion, the optical disc is detached, the second top panel is moved to the sixth position at which the second top panel is overlapped with the first top panel, and in this state, the first top panel is moved to the fourth position at which the first top panel covers a part of the tray main body, the tray auxiliary portion is stored in the tray main body, with the result that those components are reduced in size and thickness and can be integrally taken into the main body portion. Thus, the electronic apparatus that drives the optical disc can be reduced in size and thickness.

The tray main body may be capable of being moved between a seventh position and an eighth position. The seventh position corresponds to a position at which the tray main body is taken inside the main body portion without protruding outside the main body portion, and the eighth position corresponds to a position at which the tray main body is taken out by a length shorter than the diameter of the optical disc having a maximum diameter among optical discs capable of being mounted on the mounted portion and at which the mounted portion is get out of the main body portion. With this structure, it is possible to taken out the tray main body up to a position at which the mounted portion is get out of the main body portion and easily mount the optical disc on the mounted portion, and it is also possible to make the tray main body small.

It is desirable that the first top panel includes a hinge mechanism to turnably connect the first top panel and the second top panel, and at least one of the first top panel and the second top panel includes a first light shielding portion that prevents, when the second top panel is disposed at the fifth position, leakage of light from the optical system of the tray main body with the first and second top panels being overlapped with each other. With this structure, when the second top panel is disposed at the fifth position, the light shielding portion can prevent the leakage of light from a part of the hinge mechanism.

The tray main body and the tray auxiliary portion may be turnably supported through a connection member. The connection member has one end portion that is turnably supported by the tray main body and another end portion that is turnably supported by the tray auxiliary portion. With this structure, by moving the tray auxiliary portion to the first position with respect to the tray main body, the optical disc can be stored, and the size of the tray main body can be reduced by the length of the connection member as compared to a case where the connection member is not provided. That is, the connection member is turned with respect to the tray main body, and the tray auxiliary portion is turned with respect to the connection member, thereby making it possible to position the end of the tray auxiliary portion outside the tray main body by the length of the connection member. Accordingly, even when the size of the tray main body is reduced by the length of the connection member, it is possible to prevent the tray auxiliary portion from being contacted with the mounted portion.

The electronic apparatus may further include a detection portion to detect a position of one of the first top panel and the second top panel and means for stopping drive of the drive portion in one of a case where the detection portion detects that the first top panel is disposed at the third position and a case where the detection portion detects that the second top panel is disposed at the sixth position. With this structure, it is possible to stop the drive of the drive portion when the first top panel is disposed at the third position or when the second top panel is disposed at the sixth position.

One of the connection member and the tray auxiliary portion engages with another one of the connection member and the tray auxiliary portion to function as a second light shielding portion that prevents, when the tray auxiliary portion is disposed at the first position, leakage of light from the optical system.

As described above, according to the embodiment of the present invention, the electronic apparatus that drives the optical disc can be reduced in size and thickness.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 7A to 7C are cross-sectional views of the optical disc drive taken along the lines A-A, B-B, and C-C of FIG. 3, respectively;

FIGS. 8A to 8C are enlarged views of a part in the vicinity of a first connection member shown in FIGS. 7A to 7C, respectively;

FIGS. 9A to 9C are cross-sectional views of the optical disc drive taken along the lines D-D, E-E, and F-F of FIG. 6;

FIGS. 11A to 11F are a plan view, a left side view, a right side view, a front view, a back view, and a bottom view of the tray main body of the optical disc drive, respectively;

FIGS. 14A to 14F are a plan view, a left side view, a right side view, a front view, a back view, and a bottom view of a tray auxiliary portion of the optical disc drive, respectively;

FIG. 15 is a perspective view of the tray auxiliary portion shown in FIG. 14;

FIGS. 16A to 16F are a plan view, a left side view, a right side view, a front view, a back view, and a bottom view of a second connection member of the optical disc drive, respectively;

FIGS. 17A to 17F are a plan view, a left side view, a right side view, a front view, a back view, and a bottom view of a first top panel of the optical disc drive, respectively;

FIGS. 18A to 18F are a plan view, a left side view, a right side view, a front view, a back view, and a bottom view of a second top panel of the optical disc drive, respectively.

DESCRIPTION OF PREFERRED EMBODIMENT

Hereinafter, an embodiment of the present invention will be described with reference to the drawings.

Figure 1:
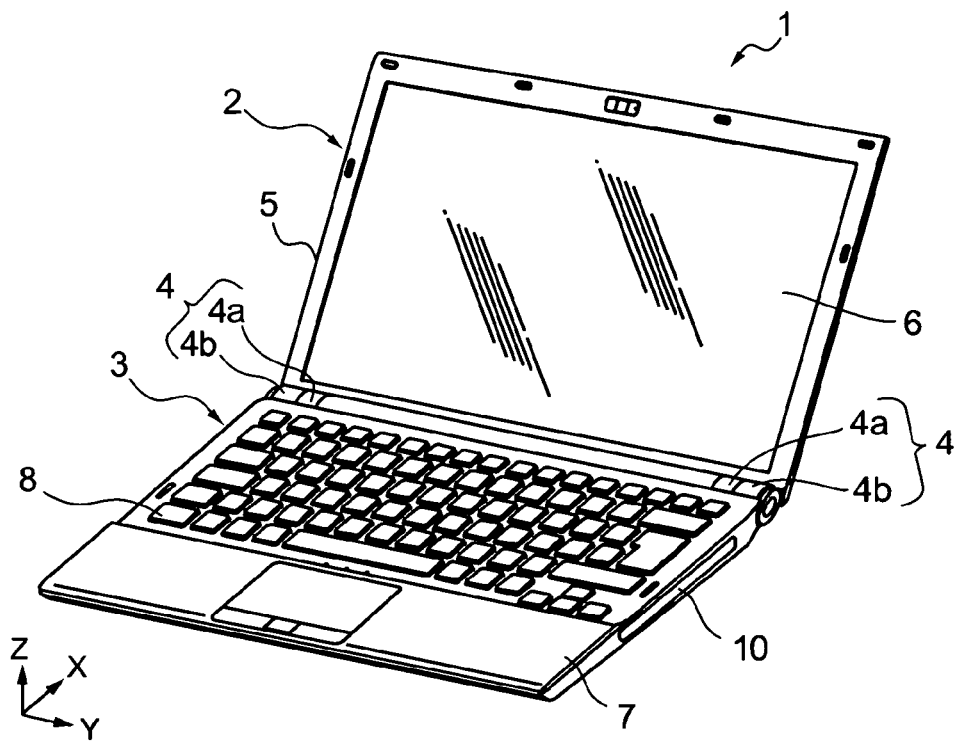
FIG. 1 is a perspective view of an electronic apparatus according to the embodiment of the present invention.
Figure 2:
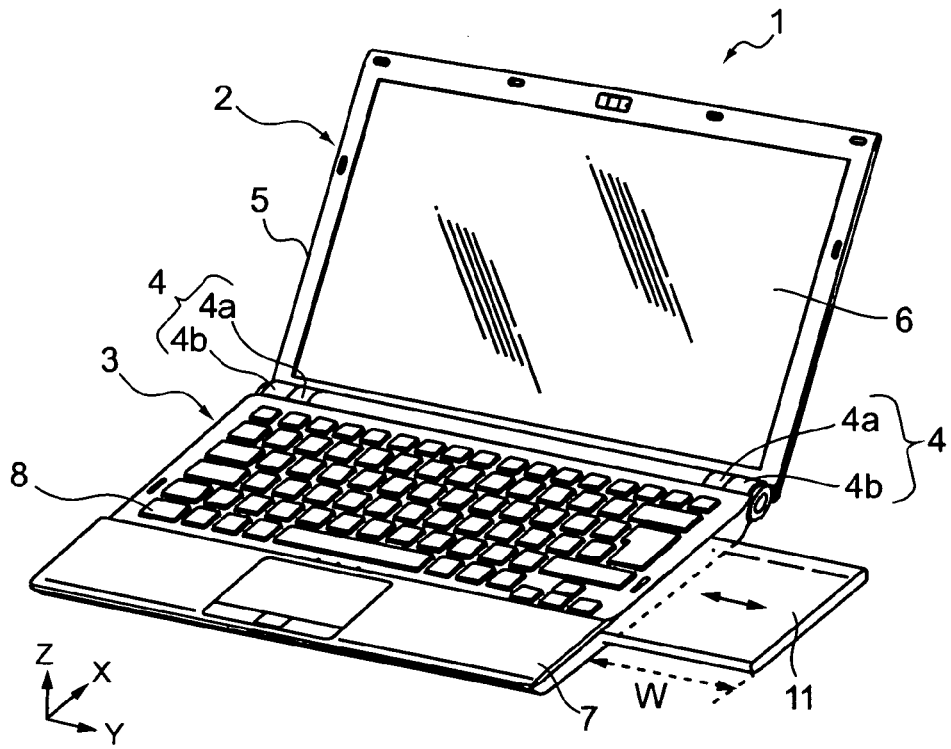
FIG. 2 is a perspective view of the electronic apparatus shown in FIG. 1 in a state where a disc store portion of an optical disc drive thereof is drawn out.

FIG. 1 is a perspective view of an electronic apparatus according to the embodiment of the present invention, and FIG. 2 is a perspective view of the electronic apparatus shown in FIG. 1 in a state where a disc store portion of an optical disc drive thereof is drawn out.

An electronic apparatus 1 includes a display portion 2, a main body portion 3, and a hinge 4 that connects the display portion 2 and the main body portion 3 with each other. The main body portion 3 includes an optical disc drive 10 capable of driving an optical disc.

The display portion 2 can be opened or closed (folded) with respect to the main body portion 3 through the hinge 4. The display portion 2 includes a display-side casing 5, a display surface 6, and a display processing unit (not shown) that is provided in the display-side casing 5 and performs a display processing.

The display-side casing 5 is a casing of the display portion 2 and stores the display processing unit (not shown). The display surface 6 is a screen for displaying information and is opposed to the main body portion 3 in a closed state. The display-side casing 5 is provided with two tube-shaped connection portions 4a. The two connection portions 4a are connected with connection portions 4b on a main body side, to constitute the hinge 4.

The main body 3 includes a casing 7, a keyboard unit 8 stored in the casing 7, the optical disc drive 10, and the like. The optical disc drive 10 reads information recorded on a recording medium such as an optical disc.

As shown in FIG. 2, the optical disc drive 10 includes a disc store portion 11 capable of being drawn out from a lateral surface of the main body 3. The disc store portion 11 is slidable (can be taken in/out) in a Y direction of FIG. 2 with respect to the casing 7 of the main body 3. A maximum length W by which the disc store portion 11 is taken out in the Y direction is shorter than a diameter of the optical disc stored in the disc store portion 11. In FIG. 1, the disc store portion 11 is not protruded to the outside of the casing 7 but stored in the casing 7.

Figure 3:
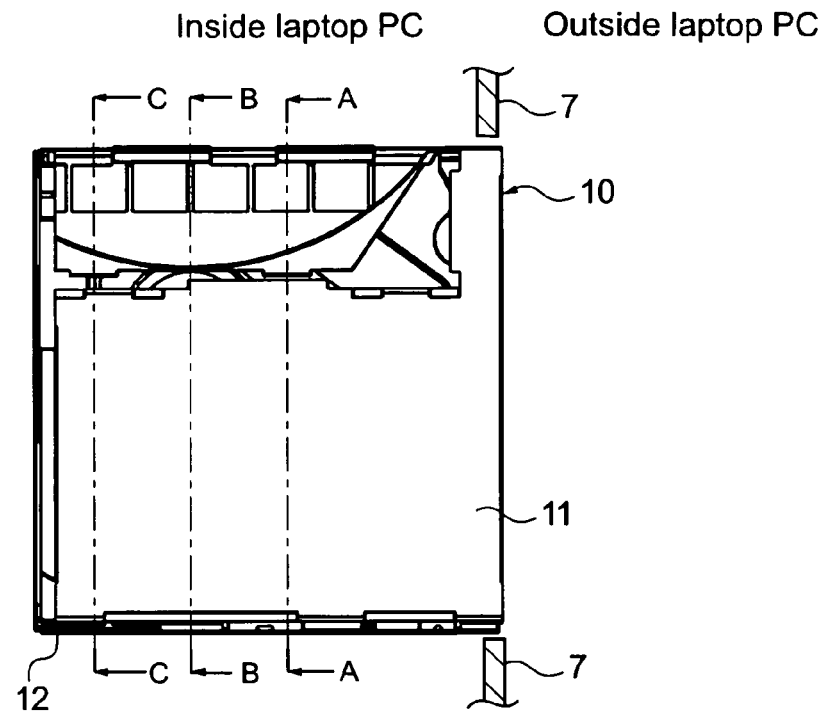
FIG. 3 is a plan view of the optical disc drive in a state where the disc store portion is stored in a casing.
Figure 4:
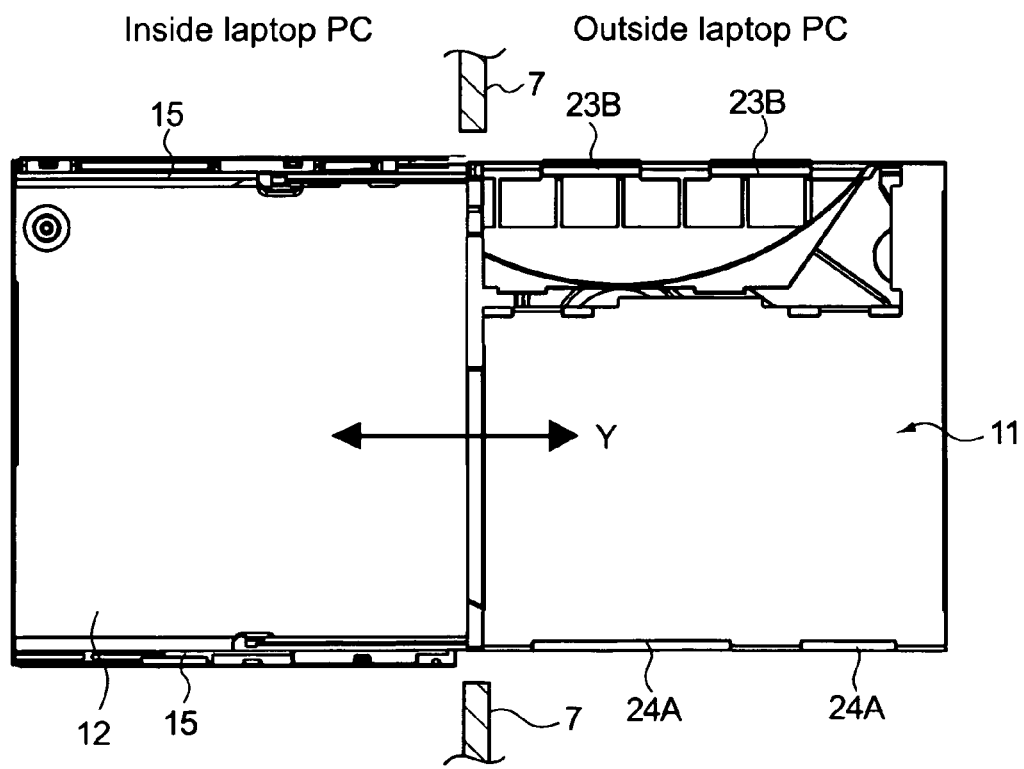
FIG. 4 is a plan view of the optical disc drive in a state where the disc store portion is drawn out of the casing.

FIG. 3 is a plan view of the optical disc drive 10 in the state where the disc store portion 11 is stored in the casing 7 (the state shown in FIG. 1), and FIG. 4 is a plan view of the optical disc drive 10 in the state where the disc store portion 11 is drawn out from the casing 7 (the state shown in FIG. 2). It should be noted that in FIGS. 3 and 4, the left side of the casing 7 corresponds to the inside of the electronic apparatus 1, and the right side of the casing 7 corresponds to the outside of the electronic apparatus 1 (the same holds true for subsequent drawings).

As shown in FIGS. 3 and 4, the optical disc drive 10 includes the disc store portion 11 and a bottom 12 that allows the disc store portion 11 to slide. In a state where the disc store portion 11 is stored in the casing 7 (FIG. 3), the disc store portion 11 is disposed in the bottom 12. In a state where the disc store portion 11 is drawn out from the bottom 12 in a direction of the arrow Y (FIG. 4), the disc store portion 11 is disposed outside the casing 7. The bottom 12 is fixed in the casing 7 and includes a pair of rail guide portions 15 disposed in parallel to each other in the Y direction in which the disc store portion 11 is slid (see, FIG. 4). The pair of rail guide portions 15 guides the disc store portion 11 in the Y direction.

Figure 5:
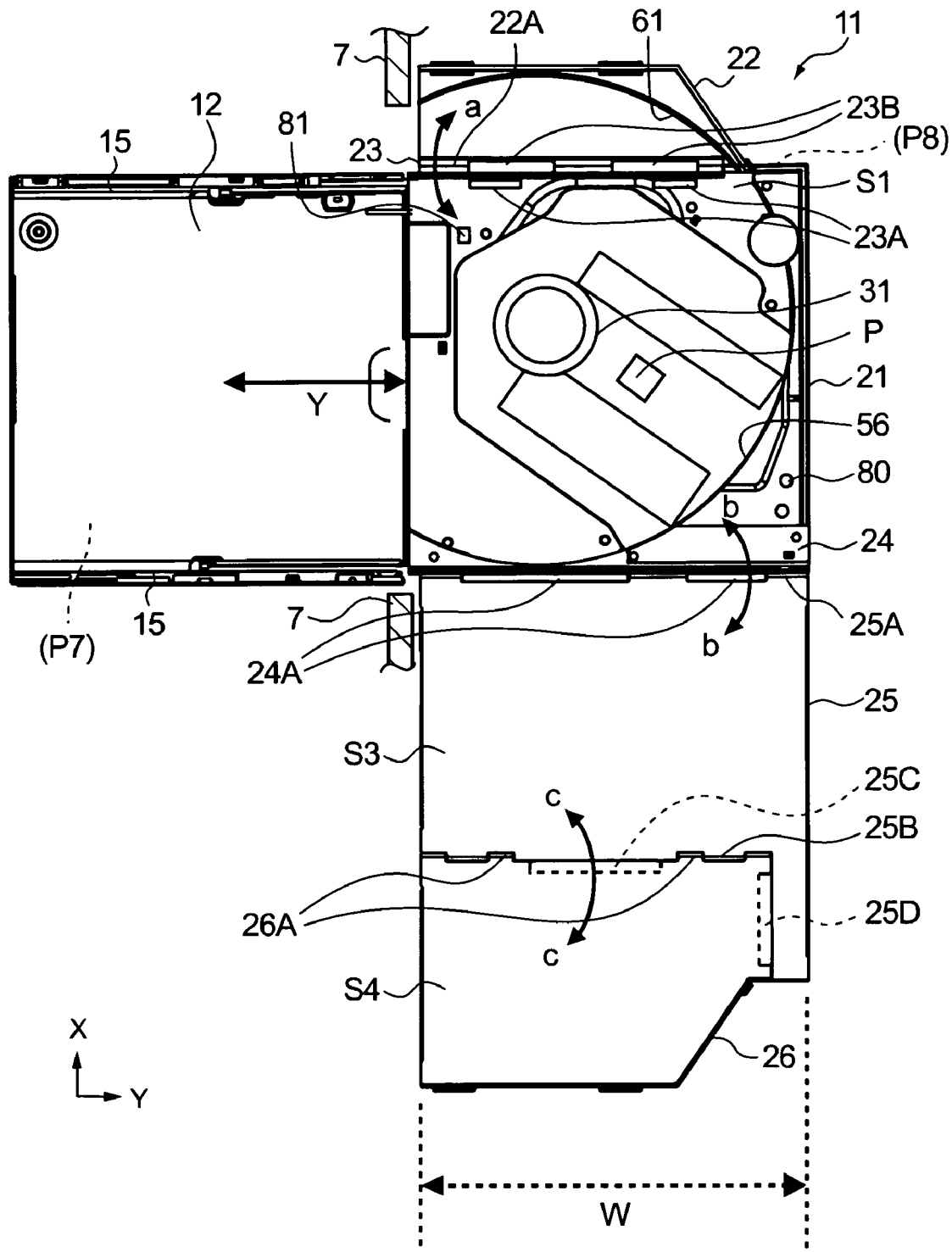
FIG. 5 is a plan view showing a state where members that constitute the disc store portion are opened.

FIG. 5 is a plan view showing a state where members that constitute the disc store portion 11 are opened.

The disc store portion 11 includes a tray main body 21, a tray auxiliary portion 22, a first connection member 23, and a second connection member 24, a first top panel 25, a second top panel 26, and the like.

The tray main body 21 is guided by the pair of rail guide portions 15 of the bottom 12 and provided between a seventh position P7 and an eighth position P8 slidably in the Y direction. The seventh position P7 corresponds to a position at which the tray main body 21 is stored in the casing 7 without being protruded to the outside. The eighth position P8 corresponds to a position at which the tray main body 21 is drawn out of the casing 7 by the length W shorter than the diameter of an optical disc having a maximum diameter and capable of being mounted on a mounted portion 31, and the mounted portion 31 is get out of the casing 7. The tray main body 21 has a rectangular shape that is almost the same as the bottom 12, and is smaller than the optical disc. At a position that is not the center of the tray main body 21, the mounted portion 31 on which the optical disc is mounted is provided. The mounted portion 31 is rotated by a drive portion (not shown).

The tray auxiliary portion 22 can be opened or closed (turned) with respect to the tray main body 21 in a direction of the arrow a. In other words, the tray auxiliary portion 22 can be turned with respect to the tray main body 21 so that a surface S1 of the tray main body 21 and a surface S2 of the tray auxiliary portion 22 are opposed or so that the surface S1 and the surface S2 are flush with each other.

The first connection member 23 is provided between the tray main body 21 and the tray auxiliary portion 22 and connected to each of the tray main body 21 and the tray auxiliary portion 22 by a hinge mechanism. The first connection member 23 includes a hinge portion 23A connected to the tray main body 21 and a hinge portion 23B connected to the tray auxiliary portion 22. The tray main body 21 includes a hinge portion connected with the hinge portion 23A, and the tray auxiliary portion 22 includes a hinge portion 22A connected to the hinge portion 23B. With this structure, the first connection member 23 can be folded with respect to the tray main body 21, and the tray auxiliary portion 22 can be folded with respect to the first connection member 23. In addition, the tray main body 21, the tray auxiliary portion 22, and the first connection member 23 can be opened so as to be approximately flush with each other as shown in FIG. 5.

The second connection member 24 includes a hinge portion 24A for connection with the first top panel 25. The hinge portion 24A is fixed to the tray main body 21.

The first top panel 25 is connected with the second connection member 24 (tray main body 21) so that the first top panel 25 can be opened or closed (turned) with respect thereto in a direction of the arrow b. In other words, the first top panel 25 is folded with respect to the tray main body 21 so that the surface S1 of the tray main body 21 and a surface S3 of the first top panel 25 are opposed to each other. The first top panel 25 includes a hinge portion 25A connected with the hinge portion 24A of the second connection member 24. The first top panel 25 includes a hinge 25B for connection with the second top panel 26. The first top panel 25 includes convex portions 25C and 25D each having a rectangular shape. The convex portion 25C has the rectangular shape, a longitudinal direction of which corresponds to a direction along a boundary between the first top panel 25 and the second top panel 26 (Y direction). The convex portion 25C is formed in the center of the longitudinal direction along the boundary between the first top panel 25 and the second top panel 26. The convex portion 25C is protruded toward the second top panel 26 side from the first top panel 25 side. The convex portion 25C is overlapped with the second top panel 26 to function as a light shielding portion that prevents leakage of light from an optical system such as an optical pickup P or the like. The convex portion 25C prevents generation of a gap between the first top panel 25 and the second top panel 26. The convex portion 25D has a long side in a direction (X direction) perpendicular to the longitudinal direction (Y direction) of the convex portion 25C. The convex portion 25D is protruded toward the second top panel 26 side from the first top panel 25 side. The convex portion 25D prevents generation of a gap between the first top panel 25 and the second top panel 26.

The second top panel 26 is connected to the first top panel 25 so as to be opened or closed (turned) with respect thereto in a direction of the arrow c. In other words, the second top panel 26 is folded with respect to the first top panel 25 in the direction of the arrow c so that the surface S3 of the first top panel 25 and a surface S4 of the second top panel 26 are opposed to each other. The second top panel 26 includes a hinge portion 26A for connection with the hinge portion 25B of the first top panel 25.

As described above, with respect to the tray main body 21, the tray auxiliary portion 22, the first connection member 23, the first top panel 25, and the second top panel 26 are turned and opened, with the result that the optical disc can be mounted. At this time, a planner shape of a part formed of the tray main body 21, the tray auxiliary portion 22, and the first connection member 23 and a planner shape of a part formed of the first top panel 25 and the second top panel 26 are almost the same. The tray main body 21, the tray auxiliary portion 22, and the first connection member 23 cover the optical disc mounted on the mounted portion 31 from a side of a recording surface of the optical disc. The first top panel 25 and the second top panel 26 cover the optical disc mounted on the mounted portion 31 from the other side of the recording surface of the optical disc.

The tray main body 21 is movably provided with the optical pickup P for reading information recorded on the optical disc mounted on the mounted portion 31. The optical pickup P includes an optical system that irradiates the optical disc with light and receives reflection light. The tray main body 21 includes a detection portion 80 that detects an opened/closed state of the first top panel 25 with respect to the tray main body 21. The tray main body 21 further includes a detection portion 81 that detects whether the optical disc is mounted on the mounted portion 31. It should be noted that positions at which the detection portions 80 and 81 are disposed are not particularly limited and can be changed as appropriate.

Figure 6:
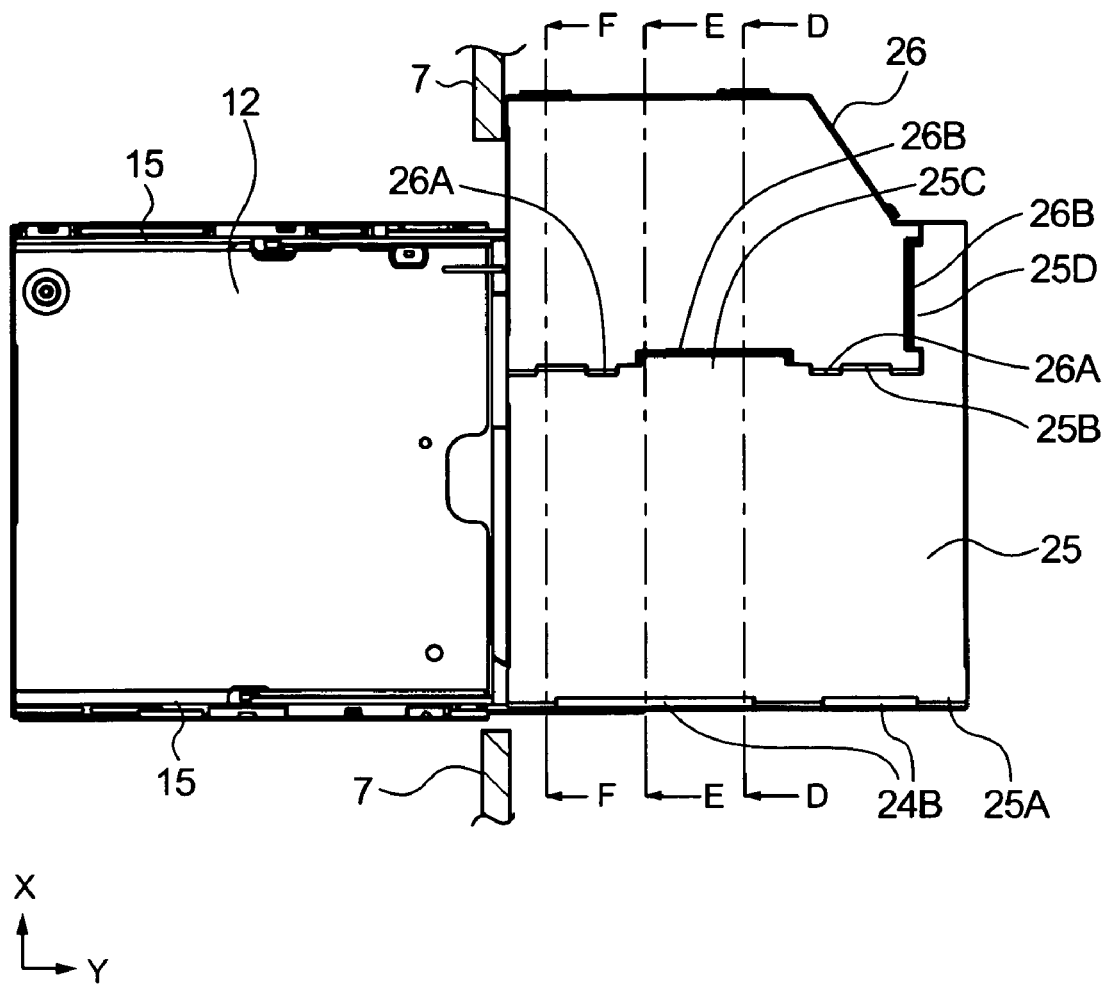
FIG. 6 is a plan view showing a state where a first top panel and a second top panel are integrally closed with respect to a tray main body shown in FIG. 5.

FIG. 6 is a plan view showing a state where the first top panel 25 and the second top panel 26 are integrally closed with respect to the tray main body 21 shown in FIG. 5.

The tray main body 21, the tray auxiliary portion 22, the first connection member 23, the first top panel 25, and the second top panel 26 are folded and superposed in an approximately planar form, and store the optical disc mounted on the mounted portion 31 without leakage of light. The hinge portion 25B, the hinge portion 26A, and the convex portions 25C and 25D completely fill a gap between the first top panel 25 and the second top panel 26. The convex portion 25C of the first top panel 25 is fitted to a concave portion 26B of the second top panel 26 and overlapped in a planar view. The convex portion 25D of the first top panel 25 is fitted to a concave portion 26B on another side of the second top panel 26 and overlapped in a planar view. A length in a direction (X direction) in which the first top panel 25 and the second top panel 26 are disposed is almost the same as the diameter of the optical disc.

FIGS. 7A to 7C are cross-sectional views of the optical disc drive 10 taken along the lines A-A, B-B, and C-C of FIG. 3, respectively. That is, FIG. 7A is a cross-sectional view vertically taken along a center area of the optical disc drive 10, FIG. 7B is a cross-sectional view vertically taken along a center area of the mounted portion 31 of the optical disc drive 10, and FIG. 7C is a cross-sectional view vertically taken along an area close to the end of the optical disc drive 10.

As shown in FIG. 7A, the first connection member 23 is turned at a predetermined angle with respect to the tray main body 21 through the hinge portion 23A, and the tray auxiliary portion 22 is turned at a predetermined angle with respect to the first connection member 23. At this time, a protrusion portion 32 of the tray auxiliary portion 22 is contacted with the surface S1 of the tray main body 21. That is, the protrusion portion 32 is stored in a store portion K around the mounted portion 31. Accordingly, the bottom 12 and the tray auxiliary portion 22 are disposed approximately in parallel to each other. As shown in FIG. 7C, the cross section of the protrusion portion 32 of the tray auxiliary portion 22 has an approximately V shape, for example. The thicknesses of the tray auxiliary portion 22 and the first connection member 23 are almost the same.

As shown in FIG. 7A, the first top panel 25 is provided to be approximately parallel to the tray main body 21 through the hinge portion 24A. The second top panel 26 is turned with the hinge portion 26A with respect to the first top panel 25 and is stored in the store portion K between the tray main body 21 and the first top panel 25. The first top panel 25 and the second top panel 26 are thinner than the tray main body 21, the tray auxiliary portion 22, and the first connection member 23. At an end of the second top panel 26, a side wall 33 that is bent is provided.

At both ends of the tray main body 21, a pair of rails 21R is provided. The rails 21R are slidably provided in the rail guide portions 15 and can be moved in a direction vertical to a plane of FIG. 7. The rails 21R each have an approximately rectangular cross section. The rail guide portion 15 has a shape such that the rails 21R are surrounded from outside. That is, the rail guide portions 15 are provided so as to be in contact with a bottom surface, a side wall, and the like of the rails 21R. Each of the rail guide portions 15 is reinforced by a reinforcement member 38 for reinforcing the rail guide portions 15. The reinforcement member 38 is disposed on the outside of the rail guide portion 15 so as to surround the rail guide portion 15 from the outside. A member used for the reinforcement member 38 is thicker than a member used for the rail guide portion 15. It should be noted that the thickness of the member used for the reinforcement member 38 may be appropriately changed depending on the quality of the member.

FIGS. 8A to 8C are enlarged views of a part in the vicinity of the first connection member 23 shown in FIGS. 7A to 7C, respectively.

As shown in FIGS. 8A and 8B, the first connection member 23 includes a convex portion 41 that protrudes in a direction along a line connecting the hinge portion 23A with the hinge portion 23B. As shown in FIGS. 8A and 8B, the tray auxiliary portion 22 includes a concave portion 42 formed thereon. The convex portion 41 can be fitted to the concave portion 42. In addition, as shown in FIG. 8C, the first connection member 23 includes a concave portion 43 to which a corner portion 44 of the rail guide portion 15 is fitted.

Further, when the first connection member 23 is not bent vertically to the tray main body 21 but diagonally bent in an upward and outward direction of the tray main body 21 as shown in FIG. 8B, the tray auxiliary portion 22 is stabilized with respect to the tray main body 21.

FIGS. 9A to 9C are cross-sectional views of the optical disc drive 10 taken along the lines D-D, E-E, and F-F of FIG. 6. Specifically, FIG. 9A shows a cross-sectional view of the optical disc drive 10 vertically taken along the center area thereof, FIG. 9B shows a cross-sectional view of the optical disc drive 10 vertically taken along the center area of the mounted portion 31 thereof, and FIG. 9C shows a cross-sectional view of the optical disc drive 10 vertically taken along an end area thereof.

The tray main body 21, the tray auxiliary portion 22, the first connection member 23, the first top panel 25, and the second top panel 26 form the store portion K inside those members. In the store portion K, an optical disc (not shown) mounted on the mounted portion 31 can be rotated. As shown in FIG. 9A, the surface S1 of the tray main body 21, the surface S2 of the tray auxiliary portion 22, and a surface S5 of the first connection member 23 are flush with one another. The surface S1, the surface S2, and the surface S5 are opposed to the recording surface of the optical disc (not shown) mounted on the mounted portion 31. The first top panel 25 and the second top panel 26 are approximately parallel to the surfaces S1, S2, and S5. The first top panel 25 and the second top panel 26 are opposed approximately in parallel to a surface opposite to the recording surface of the optical disc (not shown) mounted on the mounted portion 31. The side wall 33 of the second top panel 26 is fitted to a V-shaped concave portion of the protrusion portion 32 of the tray auxiliary portion 22. The height of the side wall 33 is adjusted so that the first top panel 25 and the second top panel 26 are parallel to the bottom surface of the bottom 12. The convex portion 25C of the first top panel 25 is fitted to the concave portion 26B of the second top panel 26.

Figure 10A:
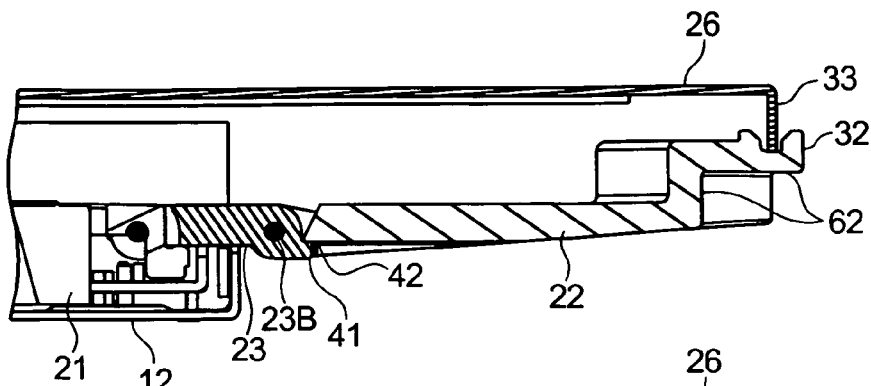
FIGS. 10A to 10C are enlarged views of a part in the vicinity of the first connection member.
Figure 10B:
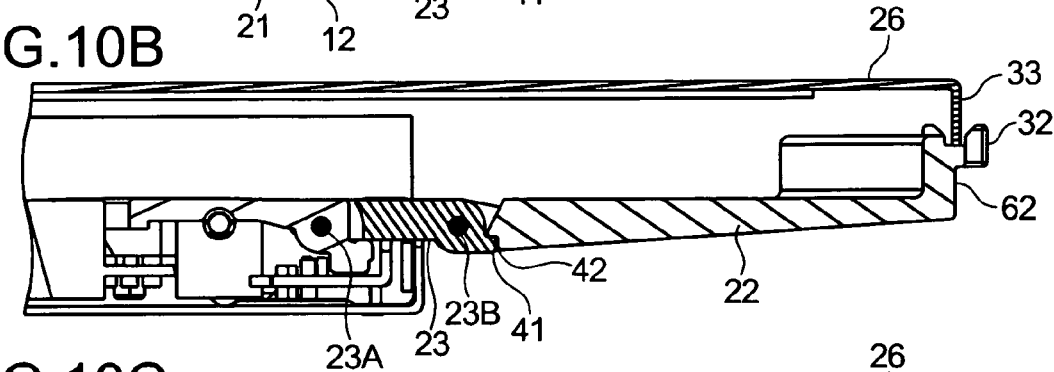
Figure 10C:
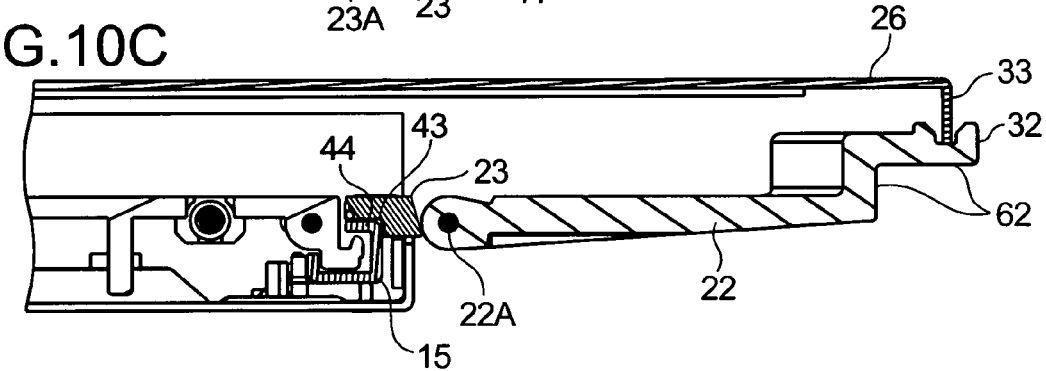
Figure 10D:
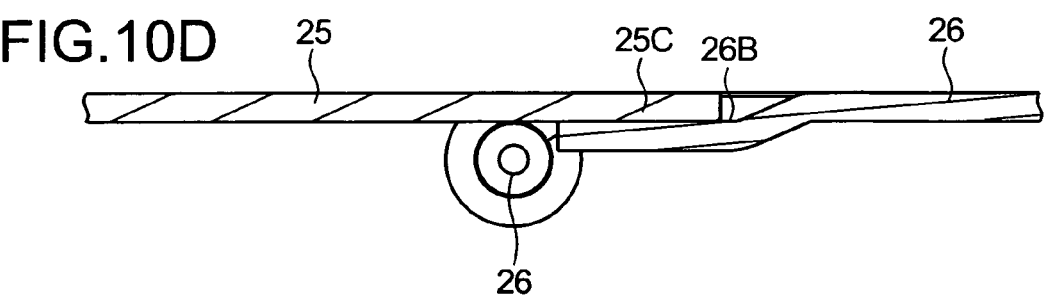
FIG. 10D is an enlarged view of a part in the vicinity of a hinge portion shown in FIG. 9A.

FIGS. 10A to 10C are enlarged views of a part in the vicinity of the first connection member 23 shown in FIGS. 9A to 9C, respectively, and FIG. 10D is an enlarged view of a part in the vicinity of the hinge portion 26A shown in FIG. 9A.

As shown in FIG. 10A, the convex portion 41 of the first connection member 23 is fitted to the concave portion 42 of the tray auxiliary portion 22. As shown in FIG. 10B, the convex portion 41 of the first connection member 23 is almost closely fitted to the concave portion 42 of the tray auxiliary portion 22. As shown in FIG. 10C, the first connection member 23 is almost closely contacted with the hinge portion 22A of the tray auxiliary portion 22. That is, when the tray auxiliary portion 22 is turned with respect to the first connection member 23 and when the first connection member 23 and the tray auxiliary portion 22 are flush with each other as shown in FIG. 10C, the first connection member 23 and an outer peripheral surface of the tray auxiliary portion 22 are in close contact with each other. As shown in FIG. 10C, the corner portion 44 of the rail guide portion 15 is fitted to the concave portion 43 of the first connection member 23. When the second top panel 26 is in the opened state with respect to the first top panel 25, the convex portion 25C of the first top panel 25 is fitted to the concave portion 26 of the second top panel 26 as shown in FIG. 10D.

FIGS. 11A to 11F are a plan view, a left side view, a right side view, a front view, a back view, and a bottom view of the tray main body 21 of the optical disc drive 10, respectively. It should be noted that the mounted portion 31 and other portions are not shown.

The tray main body 21 has an approximately rectangular shape and has a smaller size than the optical disc (not shown). Specifically, a length L1 of the tray main body 21 in a direction (Y direction) in which the tray main body 21 is drawn and a length L2 thereof in a direction (X direction) perpendicular to the direction (Y direction) in which the tray main body 21 is drawn are shorter than the diameter of the optical disc having a maximum diameter among optical discs which can be mounted on the mounted portion 31. On an end k1 on a side where the first connection member 23 of the tray main body 21 is connected, a plurality of concave portions 51 are formed. To the plurality of concave portions 51, the hinge portion 23A of the first connection member 23 is fitted. On an end k2 of the tray main body 21, which is parallel to the end k1, a side wall 54 is formed. Along an end k3 perpendicular to the end k1, a side wall 53 is formed. On the tray main body 21, a first store portion 56 having a shape to which the outline of the optical disc is partially fitted is formed. The first store portion 56 forms a part of the store portion K that stores the optical disc therein. On the tray main body 21, a plurality of screw holes 57 are formed on the same side as the surface S1.

FIGS. 12A to 12F are a plan view, a left side view, a right side view, a front view, a back view, and a bottom view of the first connection member 23 of the optical disc drive 10, respectively. FIG. 13 is a perspective view of the first connection member 23 shown in FIG. 12.

The first connection member 23 is a stick-shaped member having a long side (Y direction). On one side of the first connection member 23 in the direction (X direction) perpendicular to the longitudinal direction (Y direction) thereof, the hinge portions 23A are formed at a predetermined interval in the longitudinal direction. The hinge portions 23A are fitted to the concave portions 51 of the tray main body 21 shown in FIG. 11. The length of the hinge portion 23A can be changed depending on the length of concave portion 51 shown in FIG. 11 as appropriate. It should be noted that in this case, the lengths are determined so as not to generate a gap between the concave portions 51 shown in FIG. 11 and the hinge portions 23A of the first connection member 23 shown in FIG. 12.

On the other side in the direction (X direction) perpendicular to the longitudinal direction (Y direction) of the first connection member 23, a plurality of hinge portions 23B are formed at a predetermined interval in the longitudinal direction. The length of the hinge portion 23B can be changed depending on the length of the hinge portion 22A (see FIG. 14) of the tray auxiliary portion 22 as appropriate. It should be noted that in this case, the lengths are determined so as not to generate a gap between the hinge portions 23B shown in FIG. 12 and the hinge portions 22A of the tray auxiliary portion 22 shown in FIG. 14.

Figure 12E:
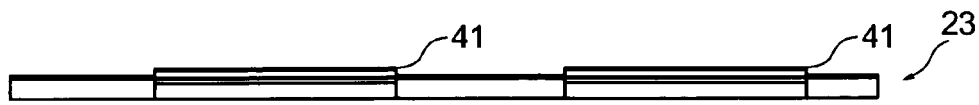
FIGS. 12A to 12F are a plan view, a left side view, a right side view, a front view, a back view, and a bottom view of the first connection member of the optical disc drive, respectively.
Figures 12A, 12B, 12C:
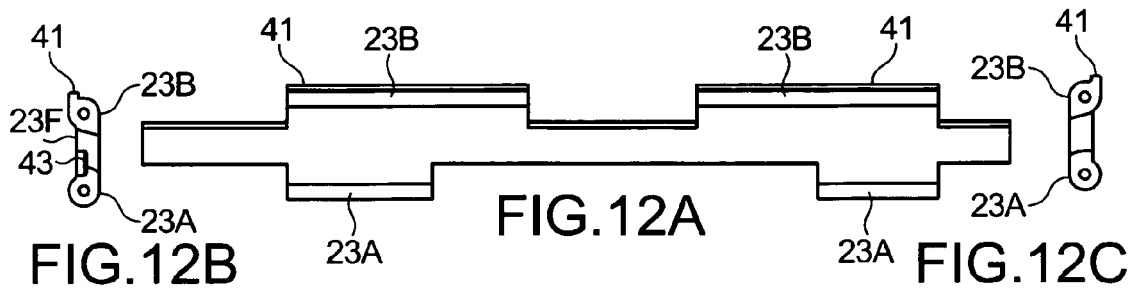
Figure 12D:
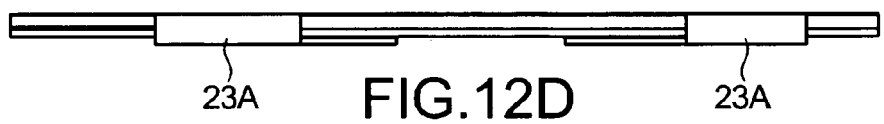
Figure 12F:
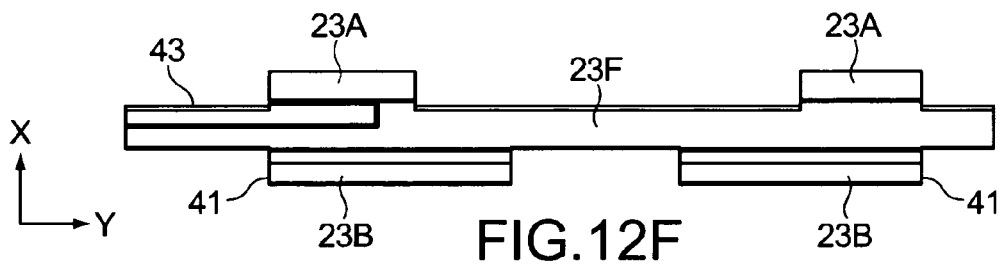
Figure 13:
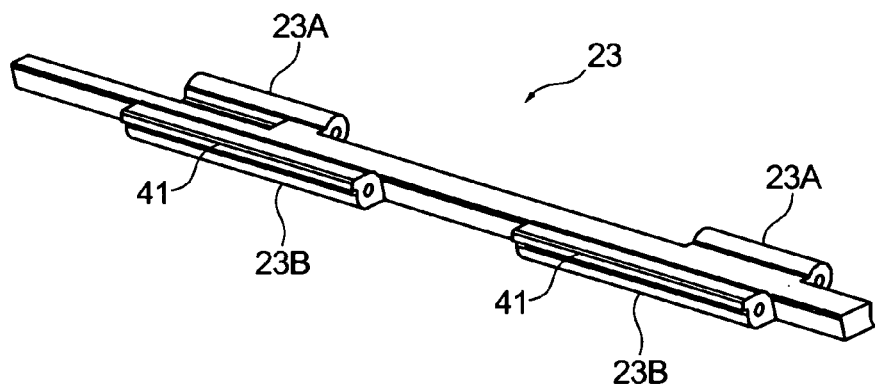
FIG. 13 is a perspective view of the first connection member shown in FIG. 12.

At the end of the hinge portion 23B, the convex portion 41 is formed (see, FIGS. 12B, 12C, and 13). The convex portion 41 is formed over the entire length of the hinge portion 23B as shown in FIG. 13. The convex portion 41 is fitted to the concave portion 42 of the tray auxiliary portion 22 shown in FIG. 10. As shown in FIGS. 12B and 12F, on a bottom surface 23F of the first connection member 23, the concave portion 43 is formed. As shown in FIG. 10C, the corner portion 44 of the rail guide portion 15 is fitted to the concave portion 43.

FIGS. 14A to 14F are a plan view, a left side view, a right side view, a front view, a back view, and a bottom view of the tray auxiliary portion 22 of the optical disc drive 10, respectively, and FIG. 15 is a perspective view of the tray auxiliary portion 22 shown in FIG. 14.

The tray auxiliary portion 22 includes the plurality of hinge portions 22A on a side thereof on which the tray auxiliary portion 22 is connected to the first connection portion 23. On the tray auxiliary portion 22, a curved second store portion 61 partially along the outline of the optical disc is formed. The second store portion 61 forms a part of the store portion K that stores the optical disc. The second store portion 61 is integrated with the first store portion 56 of the tray main body 21, to thereby form a space having a size in the X direction, which is capable of storing the optical disc mounted on the mounted portion 31. The tray auxiliary portion 22 includes a side wall 62 on an end other than the end on which the hinge portions 22A of the tray auxiliary portion 22 are formed and the end near the casing 7. The side wall 62 is protruded in a direction perpendicular to the surface S2 of the tray auxiliary portion 22.

On the side wall 62 of the tray auxiliary portion 22, the plurality of protrusion portions 32 are formed at a predetermined interval in parallel to the hinge portions 22A. As shown in FIG. 14B, the cross section of the protrusion portion 32 has an approximately V shape. As shown in FIGS. 10A to 10C, to a valley portion of the V shape of the protrusion portion 32, the side wall 33 of the second top panel 26 is fitted. The side wall 62 shown in FIG. 14 and the side wall 33 shown in FIGS. 10A to 10C are positioned in contact with each other as shown in FIGS. 10A to 10C.

FIGS. 16A to 16F are a plan view, a left side view, a right side view, a front view, a back view, and a bottom view of the second connection member 24 of the optical disc drive 10, respectively.

As shown in FIG. 16A, on an end k5 of the second connection member 24 in the longitudinal direction thereof, a plurality of hinge portions 24A are formed at a predetermined interval in the longitudinal direction. On the second connection member 24, a plurality of bosses 67 are formed at positions corresponding to the plurality of screw holes 57 of the tray main body 21 shown in FIG. 11. The second connection member 24 is fixed to the tray main body 21 through the bosses 67 by using screws (not shown). On the second connection member 24, a concave portion 65 having a curved shape partially along the outline of the optical disc is formed. The second connection member 24 includes a side wall that is protruded vertically to the surface S6 shown in FIG. 16E.

FIGS. 17A to 17F are a plan view, a left side view, a right side view, a front view, a back view, and a bottom view of the first top panel 25 of the optical disc drive 10, respectively.

The first top panel 25 includes a plurality of hinge portion 25A on the end k3 on a side on which the first top panel 25 is connected with the second connection member 24. The plurality of hinge portions 25A are provided at a predetermined interval in a direction along the end k3. The first top panel 25 includes a plurality of hinge portions 25B on an end k4 on a side on which the first top panel 25 is connected with the second top panel 26. As shown in FIG. 17A, between a pair of the hinge portions 25B, a rectangular convex portion 25C is formed. The convex portion 25C is fitted to the concave portion 26B of the second top panel 26 shown in FIG. 10D. The first top panel 25 includes, on a pair of ends k5 perpendicular to the ends k3 and k4 opposed to each other, a side wall 69 that is vertical to the surface S3. The side wall 69 almost covers the ends k5. The second top panel 26 includes a convex portion 70 that is protruded in the direction (X direction) perpendicular to the longitudinal direction (Y direction) of the convex portion 25C from a main body portion 25H of the first top panel 25. On the convex portion 70, the convex portion 25D that is protruded toward the second top panel 26 side from the convex portion 70 side is formed. A longitudinal direction of the convex portion 25D corresponds to the X direction perpendicular to the longitudinal direction (Y direction) of the convex portion 25C. On the convex portion 70, a side wall 68 is protruded in the direction vertical to the surface S3. The side wall 68 is set to be higher than the side wall 69.

FIGS. 18A to 18F are a plan view, a left side view, a right side view, a front view, a back view, and a bottom view of the second top panel 26 of the optical disc drive 10, respectively.

On the second top panel 26, a plurality of hinge portion 26A is formed on an end k6 on which the second top panel 26 is connected to the first top panel 25. The plurality of hinge portions 26A are formed at a predetermined interval in a direction (Y direction) along the end k6. On a center area of the end k6 of the second top panel 26, the concave portion 26B is formed. The concave portion 26B shown in FIG. 18A is concaved toward the back side from the front side of the second top panel 26. To the concave portion 26B, the convex portion 25C shown in FIG. 17 is fitted. On an end k7 perpendicular to the end k6 of the second top panel 26, the concave portion 26B is formed. A longitudinal direction (X direction) of the concave portion 26B is perpendicular to a longitudinal direction (Y direction) of the concave portion 26B formed on the end k6 side. On an end of the second top panel 26, other than the ends k6 and k7, side walls 71, 72, and 73 that are protruded in a direction vertical to the surface S4 are formed. The side walls 71, 72, and 73 are provided over the almost entire area of those ends of the second top panel 26.

<Mounting Operation of Optical Disc>

FIGS. 19A to 19F are diagrams for explaining a mounting operation of the optical disc.

Figure 19C:
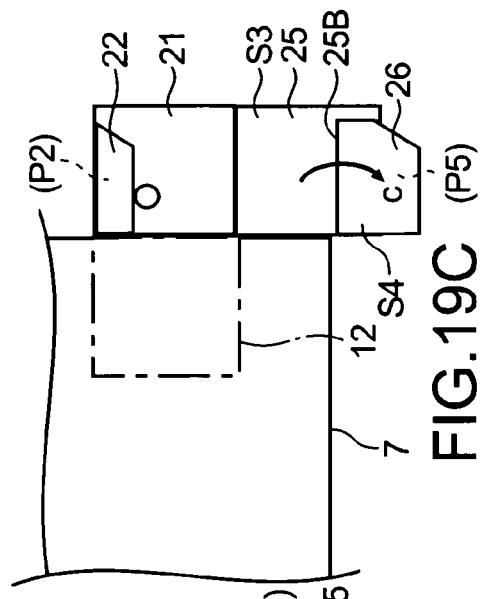
FIGS. 19A to 19F are diagrams for explaining a mounting operation of the optical disc.

A description will be given on a case where a user mounts the optical disc with respect to the electronic apparatus 1. For example, when the user presses a drawing button (not shown), the disc store portion 11 is drawn out in the Y direction from the casing 7 of the electronic apparatus (FIG. 19A). At this time, a position of the tray main body 21 before the disc store portion 11 is drawn out corresponds to the seventh position, and a position of the tray main body 21 after the disc store portion 11 is drawn out corresponds to the eighth position.

Figure 19B:
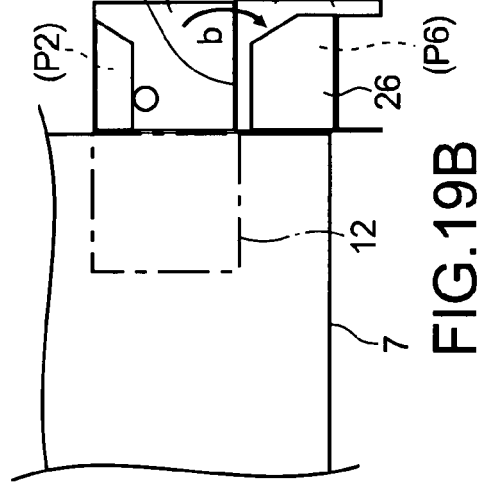
Figure 19A:
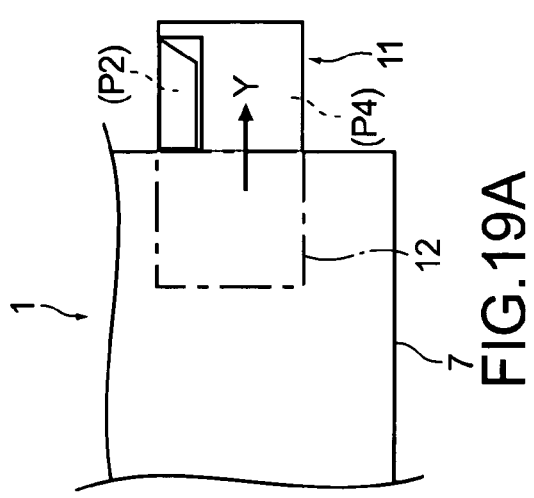

Next, the first top panel 25 and the second top panel 26 are turned with respect to the tray main body 21 and the like through the hinge portions 25A and the like in the direction of the arrow b (FIG. 19B). At this time, the first top panel 25 is disposed at a third position P3, and the second top panel 26 is disposed at a sixth position P6. In other words, in the state where the second top panel 26 is folded with respect to the first top panel 25, the first top panel 25 and the second top panel 26 are opened with respect to the tray main body 21.

Next, the second top panel 26 is turned with respect to the first top panel 25 through the hinge portions 25B and the like in the direction of the arrow c (FIG. 19C). At this time, the second top panel 26 is disposed at a fifth position P5, and the tray auxiliary portion 22 is disposed at a second position P2. Thus, the surface S3 of the first top panel 25 and the surface S4 of the second top panel 26 are approximately flush with each other. As a result, as described above, the boundary between the first top panel 25 and the second top panel 26 is blocked by the convex portion 25C and the convex portion 25D.

Figure 19F:
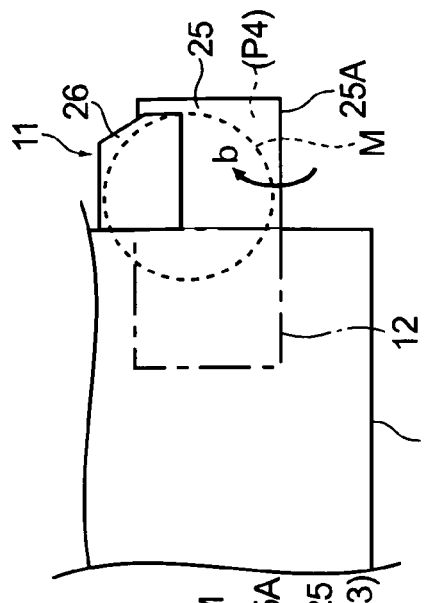
Figure 19E:
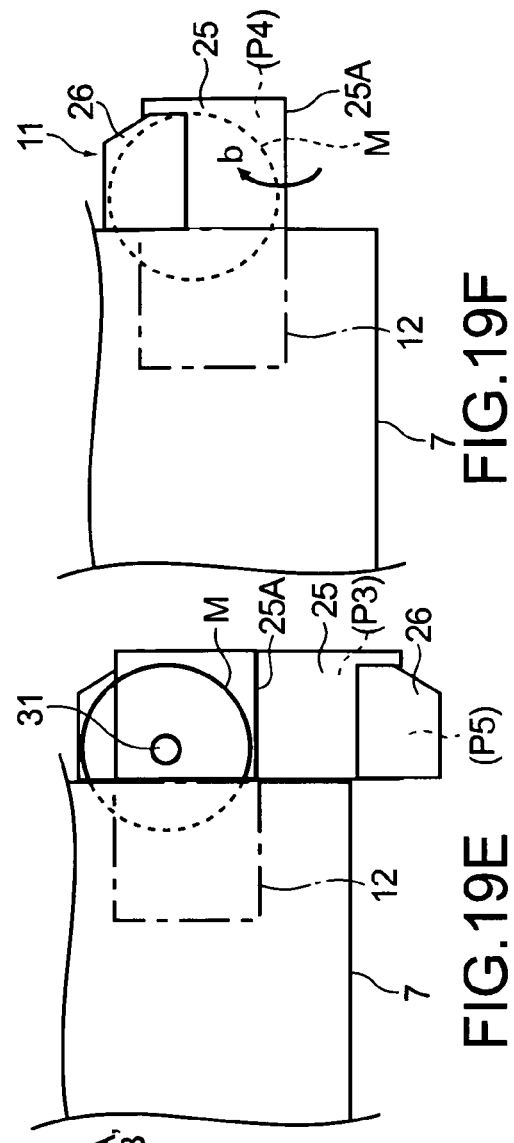
Figure 19D:
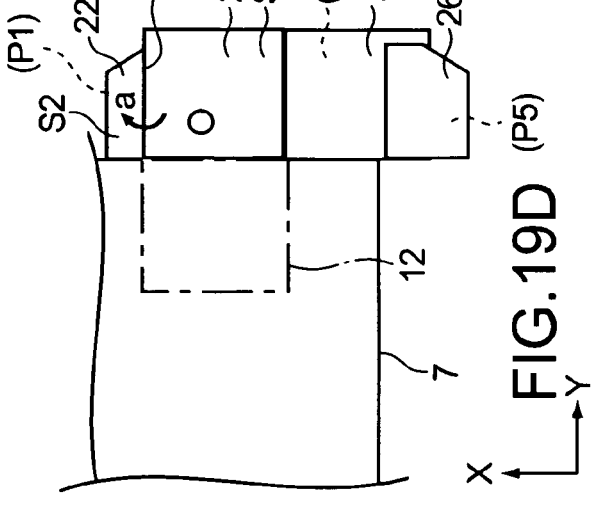

Subsequently, the tray auxiliary portion 22 and the first connection member 23 (not shown in FIG. 19) are turned with respect to the tray main body 21 through the hinge portions 23A and 23B and the like in the direction of the arrow a (FIG. 19D). At this time, the tray auxiliary portion 22 is positioned at the first position P1. Thus, the surface S1 of the tray main body 21 and the surface S2 of the tray auxiliary portion 22 are approximately flush with each other.

Subsequently, a center hole of an optical disc M is fitted to the mounted portion 31, and the optical disc M is mounted on the mounted portion 31 (FIG. 19E). At this time, a part of the optical disc M is inserted in the casing 7, and the other part of the optical disc M is stored in the tray main body 21, the tray auxiliary portion 22, and the first connection member 23. That is, a length by which the tray main body 21 is drawn out in the Y direction is shorter than the diameter of the optical disc M and longer than the radius of the optical disc M.

Further, the first top panel 25 and the second top panel 26 are integrally turned with respect to the tray main body 21, the tray auxiliary portion 22, and the first connection member 23 through the hinge portions 25A in the direction of the arrow b, thereby integrally superposing them (FIG. 19F). As a result, the optical disc M is stored in the disc store portion 11.

It should be noted that in this embodiment, in the state shown in FIG. 19A, the first top panel 25 and the second top panel 26 are integrally turned with respect to the tray main body 21 in the direction of the arrow b as shown in FIG. 19B, and then the second top panel 26 is turned with respect to the first top panel 25 as shown in FIG. 19C. However, the present invention is not limited to this example. For example, the tray auxiliary portion 22 and the like shown in FIG. 19D may be opened first, and then the first top panel 25 and the like shown in FIG. 19B may be opened. In addition, in the state shown in FIG. 19B, before the second top panel 26 is turned, the tray auxiliary portion 22 may be turned. As described above, the process of opening and closing the tray or the top panels is not particularly limited and can be changed as appropriate.

<Action and the Like>

As described above, according to this embodiment, the tray main body 21 can be drawn out of the casing 7 (FIG. 19A), and the first top panel 25 can be turned to the third position P3 along with the second top panel 26 (FIG. 19B). The second top panel 26 can be turned to the fifth position P5 with respect to the first top panel 25, and therefore the first top panel 25 and the second top panel 26 can form a lid for storing the optical disc (FIG. 19C). The tray auxiliary portion 22 can be turned to the first position P1 with respect to the tray main body 21 (FIG. 19D). In the state shown in FIG. 19D, as shown in FIG. 5, the second store portion 61 is integrated with the first store portion 56 of the tray main body 21, thereby forming the space capable of storing the optical disc mounted on the mounted portion 31. The optical disc is mounted on the mounted portion 31 (FIG. 19E), and the first top panel 25 that is integrated with the second top panel 26 is rotated to the fourth position P4 and opposed to the tray main body 21, and the second top panel 26 is opposed to the tray auxiliary portion 22, thereby making it possible to store the optical disc (FIG. 19F). In this state, the optical disc M can be driven.

The first top panel 25 and the second top panel 26 are turned to the third position P3 at which the optical disc can be mounted on/dismounted from the mounted portion 31 (FIG. 19E), and thus the optical disc can be dismounted (FIG. 19D). The second top panel 26 is turned to the sixth position P6 at which the second top panel 26 is superposed on the first top panel 25 (FIG. 19B). In this state, the first top panel 25 can be turned to the fourth position P4 opposed to the tray main body 21 (FIG. 19A). The tray auxiliary portion 22 and the first connection member 23 can be stored (folded) in the tray main body 21 (FIG. 19A). As a result, a planar size of the disc store portion 11 can be the same as the size of the tray main body 21. In other words, in a state where the disc store portion 11 is not used, the disc store portion 11 is compact as shown in FIG. 4. That is, the length of the tray main body 21 in the X direction can be shorter by the length of the tray auxiliary portion 22 and the first connection member 23. At this time, as shown in FIG. 7, the folded second top panel 26 and the tray auxiliary portion 22 are stored in the store portion K. Therefore, the disc store portion 11 can be prevented from being thick. Accordingly, the disc store portion 11 can be reduced in size and thickness, with the result that the electronic apparatus 1 that drives the optical disc M can be miniaturized and thinned.

As shown in FIGS. 19D and 19E, the tray main body 21 can be drawn up to a position at which the mounted portion 31 is positioned outside the casing 7. Thus, the user can easily and reliably mount the optical disc M on the mounted portion 31. In addition, the size of the tray main body 21 (maximum value of the length by which the tray main body 21 is drawn from the casing 7) is defined so that the length by which the mounted portion 31 is drawn from the casing 7 becomes shorter than the diameter of the optical disc M. Therefore, the size of the disc store portion 11 can be reduced, and thus the size of the electronic apparatus 1 can be reduced.

As shown in FIGS. 6 and 9, in the state where the disc store portion 11 can store the optical disc, the convex portion 25C and the convex portion 25D of the first top panel 25 are respectively fitted to the concave portion 26B of the second top panel 26 (see, FIG. 10D). Therefore, light or the like emitted from the optical pickup P can be prevented from leaking from a gap between the first top panel 25 and the second top panel 26.

Further, as shown in FIG. 10, the side wall 33 of the second top panel 26 is contacted with the side wall 62 of the tray auxiliary portion 22, with the result that the leakage of light from the optical pickup P can be prevented. In addition, as shown in FIGS. 10A and 10B, the convex portion 41 of the first connection member 23 is fitted to the concave portion 42 of the tray auxiliary portion 22, with the result that light can be prevented from leaking from a gap between the first connection member 23 and the tray auxiliary portion 22. As shown in FIG. 10C, the first connection member 23 is contacted with the hinge portion 22A of the tray auxiliary portion 22 at a position where the convex portion 41 is not provided, and therefore the leakage of light can be prevented. In addition, the corner portion 44 of the rail guide portion 15 is fitted to the concave portion 43 of the first connection member 23, with the result that light can be prevented from leaking from a gap between the first connection member 23 and the rail guide portion 15.

The disc store portion 11 includes the first connection member 23 connected to the tray main body 21 and the tray auxiliary portion 22. In this way, the portion serving as the tray capable of being folded with respect to the tray main body 21 is constituted of not one member but the plurality of members, specifically, constituted of the first connection member 23 and the tray auxiliary portion 22. In contrast, a case where the portion corresponding to the first connection member 23 and the tray auxiliary portion 22 is not formed of the two members but formed of one member, and the member is folded to the tray main body 21 through the hinge portion 23A will be considered. In this case, to prevent the member from being in contact to the mounted portion 31, it is necessary to set a length from the mounted portion 31 to the hinge portion 23A to be longer than the member, resulting in increase of the size of the disc store portion.

Then, a case where the first connection member 23 is folded to the tray main body 21 as shown in FIG. 8 and the tray auxiliary portion 22 is folded to the first connection member 23 will be considered. In this case, the mounted portion 31 can be prevented from being in contact with the tray auxiliary portion 22, and at the same time, the length from the mounted portion 31 to the hinge portion 23A (length of the tray auxiliary portion 22) can be shorter by the length of the first connection member 23, more precisely, by the length between the hinge portion 23A and the hinge portion 23B of the first connection member 23. As a result, the size of the disc store portion 11 can be further reduced.

The disc store portion 11 includes the detection portion 81 that detects whether the optical disc is mounted on the mounted portion 31 (see, FIG. 5). Further, the disc store portion 11 includes the detection portion 80 that detects the opened/closed state of the first top panel 25 with respect to the tray main body 21 (see, FIG. 5). With this structure, when the detection portion 81 judges that the optical disc is not mounted on the mounted portion 31, or when the detection portion 80 judges that the first top panel 25 is opened, the CPU in the electronic apparatus 1 stops a drive of a spindle motor serving as the drive portion that rotates and drives the mounted portion 31. Thus, security of the user can be ensured.

The tray main body 21 includes the pair of rails 21R (see, FIG. 7). The bottom 12 includes the reinforcement members 38 that reinforce the rail guide portions 15 that guide the pair of rails 21R. Thus, as shown in FIG. 6, in the state where the disc store portion 11 is drawn from the casing 7, when the optical disc is rotated by the drive portion, vibration of the disc store portion 11 with respect to the bottom 12 can be suppressed. As a result, information recorded on the optical disc can be more accurately reproduced.

Further, in the folded state in the outward and upward direction of the tray main body 21 as shown in FIG. 8B, the tray auxiliary portion 22 is disposed with respect to the tray main body 21 in a stable state. In contrast, a case where the second top panel 26 is stabilized in a state where the first connection member 23 is vertical to the tray main body 21 will be considered. In this case, the total length of the first connection member 23 and the tray auxiliary portion 22 becomes shorter as compared to the case of FIG. 8. In this case, to secure the length of the radius of the optical disc through the tray auxiliary portion 22 and the first connection member 23, it is necessary to increase the size of the tray main body 21 to such an extent that the length of the tray auxiliary portion 22 and the first connection member 23 is short. As a result, the size of the disc store portion 11 is increased.

In contrast, in the case where the first connection member 23 is diagonally disposed as shown in FIG. 8, the tray main body 21 can be smaller to such an extent that the length of the tray auxiliary portion 22 and the first connection member 23 is long, with the result that the size of the disc store portion 11 can be reduced.

It should be noted that the present invention is not limited to the above embodiment and can be variously modified within the technical idea of the present invention.

In the above embodiment, the disc store portion 11 includes the detection portion 80 that detects the opened/closed state of the first top panel 25 with respect to the tray main body 21. However, the disc store portion 11 may include a detection portion that detects an opened/closed state of the second top panel 26 with respect to the tray auxiliary portion 22 or may include both detection portions, which can ensure the security of the user in the same way as above embodiment.

In the above embodiment, the first top panel 25 includes the convex portion 25C, and the convex portion 25C is overlapped with the second top panel 26, thereby preventing the leakage of light from the optical system such as the optical pickup P. However, the present invention is not limited to this example. For example, the second top panel 26 may include a convex portion having the same shape as the convex portion 25C, and the first top panel 25 may include a concave portion. In this case, it is also possible to prevent the leakage of light from the optical pickup P or the like to the outside of the optical disc. In addition, the first connection member 23 may include a concave portion instead of the convex portion 41, and the tray auxiliary portion 22 may include a convex portion that is fitted to the concave portion of the first connection member 23 (see, FIG. 8). As a result, it is also possible to prevent the leakage of light.

In addition, in the above embodiment, the tray auxiliary portion 22 is turnably provided on one side of the tray main body 21. However, a tray main body (not shown) having a smaller size in the X direction than the tray main body 21 may be used instead of the tray main body 21, and the tray auxiliary portion may be turnably provided on both sides of the tray main body (i.e., double doors). In this case, one end of the top panel that is connected in a foldable manner may be turnably connected to one tray auxiliary portion. At this time, the top panel and the tray auxiliary portion folded may be overlapped with the tray main body in a plane. As a result, it is also possible to reduce the size and thickness of the disc store portion in the same way as the above embodiment, with the result that the electronic apparatus that drives the optical disc M can be reduced in size and thickness.

What is claimed is:

1. An electronic apparatus comprising:
   a main body portion;
   a tray main body capable of being taken into and out of the main body portion, the tray main body including a mount portion, a drive portion, an optical system, and a first store portion, the mounted portion being fitted to a center hole portion of an optical disc to allow the optical disc to be mounted thereon, the drive portion driving the mounted portion, the optical system irradiating the optical disc with light and receiving reflection light, the first store portion being a part of a store portion that stores the optical disc mounted on the mounted portion;
   a tray auxiliary portion including a second store portion that is another part of the store portion formed along an outline of the optical disc mounted on the mounted portion, the second store portion being integrated with the first store portion of the tray main body to form a space on at least one of both sides in a second direction that is perpendicular to a first direction, the space being capable of storing the optical disc mounted on the mounted portion, the first direction corresponding to a direction in which the tray main body is taken into and out of the main body portion, the tray auxiliary portion being capable of moving between a first position and a second position, the first position corresponding to a position at which a size of the space in at least the second direction is larger than a diameter of the optical disc, the second position corresponding to a position at which the tray auxiliary portion is stored in the tray main body so that the tray auxiliary portion and the tray main body are capable of being taken into and out of the main body portion;
   a first top panel capable of being moved between a third position and a fourth position, the third position corresponding to a position at which the optical disc is capable of being mounted on and detached from the mounted portion, the fourth position corresponding to a position at which the first top panel is capable of covering at least a part of the first store portion of the tray main body so that the optical disc mounted on the mounted portion is capable of being covered and so that the first top panel and the tray main body are capable of being taken into and out of the main body portion; and
   a second top panel capable of being moved between a fifth position and a sixth position, the fifth position corresponding to a position at which the second top panel is capable of covering an area other than an area covered with the first top panel at the fourth position in the first store portion of the tray main body and covering the second store portion of the tray auxiliary portion at the first position, the sixth position corresponding to a position at which the second top panel is overlapped with the first top panel so that the second top panel, the first top panel, the tray auxiliary portion, and the tray main body are capable of being taken into and out of the main body portion.

2. The electronic apparatus according to claim 1, wherein the tray main body is capable of being moved between a seventh position and an eighth position, the seventh position corresponding to a position at which the tray main body is taken inside the main body portion without protruding outside the main body portion, the eighth position corresponding to a position at which the tray main body is taken out by a length shorter than the diameter of the optical disc having a maximum diameter among optical discs capable of being mounted on the mounted portion and at which the mounted portion is get taken out of the main body portion.

3. The electronic apparatus according to claim 2, wherein the first top panel includes a hinge mechanism to turnably connect the first top panel and the second top panel, and
wherein at least one of the first top panel and the second top panel includes a first light shielding portion that prevents, when the second top panel is disposed at the fifth position, leakage of light from the optical system of the tray main body with the first and second top panels being overlapped with each other.

4. The electronic apparatus according to claim 3, wherein the tray main body and the tray auxiliary portion are turnably supported through a connection member, the connection member having one end portion that is turnably supported by the tray main body and another end portion that is turnably supported by the tray auxiliary portion.

5. The electronic apparatus according to claim 4, further comprising:
a detection portion to detect a position of one of the first top panel and the second top panel; and
means for stopping the driving of the drive portion in one of a case where the detection portion detects that the first top panel is disposed at the third position and a case where the detection portion detects that the second top panel is disposed at the sixth position.

6. The electronic apparatus according to claim 5, wherein one of the connection member and the tray auxiliary portion engages with another one of the connection member and the tray auxiliary portion to function as a second light shielding portion that prevents, when the tray auxiliary portion is disposed at the first position, leakage of light from the optical system.

* * * * *